United States Patent
Guo et al.

(10) Patent No.: US 9,503,743 B2
(45) Date of Patent: Nov. 22, 2016

(54) METHODS AND APPARATUS FOR UNI-PREDICTION OF SELF-DERIVATION OF MOTION ESTIMATION

(75) Inventors: Liwei Guo, Plainsboro, NJ (US); Peng Yin, Ithaca, NY (US); Yunfei Zheng, Plainsboro, NJ (US); Xiaoan Lu, Princeton, NJ (US); Qian Xu, Plainsboro, NJ (US); Joel Sole, Princeton, NJ (US)

(73) Assignee: Thomson Licensing (FR)

( * ) Notice: Subject to any disclaimer, the term of this patent is extended or adjusted under 35 U.S.C. 154(b) by 722 days.

(21) Appl. No.: 13/696,847

(22) PCT Filed: May 11, 2011

(86) PCT No.: PCT/US2011/000829
§ 371 (c)(1),
(2), (4) Date: Nov. 8, 2012

(87) PCT Pub. No.: WO2011/142815
PCT Pub. Date: Nov. 17, 2011

(65) Prior Publication Data
US 2013/0058413 A1 Mar. 7, 2013

Related U.S. Application Data

(60) Provisional application No. 61/333,999, filed on May 12, 2010.

(51) Int. Cl.
*H04N 7/12* (2006.01)
*H04N 11/02* (2006.01)
(Continued)

(52) U.S. Cl.
CPC ............ *H04N 19/44* (2014.11); *H04N 19/105* (2014.11); *H04N 19/109* (2014.11);
(Continued)

(58) Field of Classification Search
CPC .... H04N 19/176; H04N 19/51; H04N 19/56; H04N 19/527; H04N 19/58; H04N 19/533; H04N 19/547; H04N 19/567; H04N 19/57; H04N 5/145; H04N 19/537; H04N 19/543
USPC ......................................... 375/240.01–240.29
See application file for complete search history.

(56) References Cited

U.S. PATENT DOCUMENTS

2005/0053144 A1* 3/2005 Holcomb .................. 375/240.16
2005/0117651 A1* 6/2005 Wang et al. ............. 375/240.16
(Continued)

FOREIGN PATENT DOCUMENTS

| EP | 1335609 | 8/2003 |
|---|---|---|
| EP | 1610560 | 12/2005 |

OTHER PUBLICATIONS

Chiu et al., "Descriptioin of Video Coding Technology Proposal: Self Derivation of Motion Estimation and Adaptive (Wiener) Loop Filtering," Joint Collaborative Team on Video Coding (JCT-VC) of ITU-T SG16 WP3 and ISO/IEC JTC1/SC29/WG11, Document: JCTVC-A106.

(Continued)

*Primary Examiner* — Mehrdad Dastouri
*Assistant Examiner* — Jared Walker
(74) *Attorney, Agent, or Firm* — Jack Schwartz & Associates, PLLC

(57) ABSTRACT

Methods and apparatus are provided for uni-prediction of self-derivation of motion estimation. An apparatus includes a video encoder for encoding at least a portion of a picture. The video encoder includes a self derivation motion estimator for performing self derivation motion estimation for the portion. The self derivation motion estimation is used for selectively performing uni-prediction or bi-prediction for the portion based on one or more criterion.

37 Claims, 17 Drawing Sheets

(51) Int. Cl.
*H04N 11/04* (2006.01)
*H04N 19/44* (2014.01)
*H04N 19/105* (2014.01)
*H04N 19/139* (2014.01)
*H04N 19/176* (2014.01)
*H04N 19/70* (2014.01)
*H04N 19/46* (2014.01)
*H04N 19/513* (2014.01)
*H04N 19/109* (2014.01)

(52) U.S. Cl.
CPC ......... *H04N 19/139* (2014.11); *H04N 19/176* (2014.11); *H04N 19/46* (2014.11); *H04N 19/513* (2014.11); *H04N 19/70* (2014.11)

(56) References Cited

U.S. PATENT DOCUMENTS

| | | | |
|---|---|---|---|
| 2009/0147851 A1* | 6/2009 | Klein Gunnewiek | H04N 19/513 375/240.16 |
| 2009/0257502 A1* | 10/2009 | Ye et al. | 375/240.16 |
| 2009/0304084 A1* | 12/2009 | Hallapuro et al. | 375/240.16 |
| 2011/0002387 A1 | 1/2011 | Chiu et al. | |
| 2011/0002389 A1 | 1/2011 | Xu et al. | |

OTHER PUBLICATIONS

Kamp et al. "Description of Video Coding Technology Proposal by RWTH Aachen University," Joint Collaborative Team on Video Coding (JCT-VC) of ITU-T SG16 WP3 and ISO/IEC JTC1/SC29/WG11, Document JCTVC-A112, 1st Meeting: Dresden, DE, Apr. 15-23, 2010.

Suzuki et al., "Inter Frame Coding with Template Matching Averaging", IEEE International Conference on Image Processing 2007 (ICIP 2007), Sep. 1, 2007, pp. 111-409.

Murakami et al., "Advanced B Skip Mode with Decoder-side Motion Estimation," ITU Telecommunications Standardization Sector, Study Group 16 Question 6, Video Coding Experts Group (VCEG), Doc.: VCEG-AK12, 37th Meeting Yokohama, Japan, Apr. 15-18, 2009, 4 pages.

Search Report Dated Aug. 1. 2011.

* cited by examiner

METHODS AND APPARATUS FOR UNI-PREDICTION OF SELF-DERIVATION OF MOTION ESTIMATION

CROSS-REFERENCE TO RELATED APPLICATIONS

This application claims the benefit, under 35 U.S.C. §365 of International Application PCT/US2011/000829, filed May 11, 2011, which was published in accordance with PCT Article 21(2) on Nov. 17, 2011 in English and which claims the benefit of U.S. provisional patent application No. 61/333,999, filed May 12, 2010.

TECHNICAL FIELD

The present principles relate generally to video encoding and decoding and, more particularly, to methods and apparatus for uni-prediction of self-derivation of motion estimation.

BACKGROUND

Self Derivation of Motion Estimation (SDME) is a process in video encoding and decoding in which motion vector information is derived at the decoder, rather than specifically transmitted or otherwise conveyed from the encoder to the decoder. Since the transmission or conveyance of motion vector information from the video encoder side to the video decoder side is skipped, a higher coding efficiency is achieved. In the state of the art coding schemes, SDME is performed only for the bi-predictive mode (or B prediction).

In greater detail, in the International Organization for Standardization/International Electrotechnical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), a macroblock (MB) can be partitioned into various blocks for encoding and the motion vector is assigned to each partitioned block. To save the bandwidth for motion vector information, techniques to derive motion vectors at the video decoder side have been proposed in a first prior art approach to replace the original B-Skip mode with a derived motion vector by a new mirror-based motion search operation at both the encoder and the decoder. The work of self derivation of motion estimation is further explored with respect to a second prior art approach in order to design a new SDME coding mode with the merit of extending block size to increase the prediction accuracy.

Mirror motion estimation has been explored on SDME to predict the motion vector among forward and backward reference pictures. Turning to FIG. 1, an example of how mirror motion estimation is performed for the scenario of two B pictures between two reference pictures L0 and L1 is indicated generally by the reference numeral 100. In the example, reference picture L0 is denoted by FW Ref and reference picture L1 is denoted by BW Ref. The two B pictures are denoted by B0 and B1. Consider B0 as the current encoding picture. A motion vector between B0 and FW Ref is denoted by MV0, and a motion vector between B1 and BW Ref is denoted by MV1. The current encoding picture, namely B0 includes a current or target block 110. The reference picture FW Ref (as well as reference picture BW Ref, although not explicitly shown there for) includes a search window 120 and a reference (ref) block 125 within the search window 120. When encoding a target block in B0, the SDME can be generally described as follows:

1. Specify a search window in the forward reference picture.
2. Specify a search pattern in the forward search window. Full search or simplified fast search patterns can be the options to select and the same search pattern will apply on both the video encoder side and the video decoder side.
3. For motion vector MV0 in the forward search window, the mirror motion vector MV1 in the backward search window is derived as follows based on the temporal picture distance, where d0 is the distance between the current picture and the forward reference picture and d1 is the distance among the current picture and the backward reference picture:

$$MV1 = -\frac{d_1}{d_0}MV0$$

4. Calculate the cost metric of a motion search (using sum of absolute differences (SAD)) between the reference block (pointed by MV0) in the forward reference picture and the reference block (pointed by MV1) in the backward reference picture.
5. The SDME motion vector is selected as the MV0 candidate with the minimum SAD value in spiral order of all candidates in the search pattern.

Using mirror ME, a pair of motion vectors MV0 and MV1 is derived. We denote the current target block as T. The forward prediction pixel in the forward reference picture $R_0$, denoted as $R_0(MV0)$, can be found by MV0 in the forward reference picture. The backward prediction pixel in backward reference picture $R_1$, denoted as $R_1(MV1)$, can be found by MV1 in the backward reference picture. The bi-directional prediction of SDME could be the average of $R_0(MV0)$ and $R_1(MV1)$, or the weighted average $[R_0(MV0)*d1+R_1(MV1)*d0+(d0+d1)/2]/(d0+d1)$.

Multiple block partitions can be available for SDME. The encoder and decoder should adopt the same partition pattern through the coding syntax used at both sides. Block partitions of 16×16, 16×8, 8×16, and 8×8 have been applied to the bi-prediction coding modes, and the 8×8 block partition is in use only in the direct_8×8 coding mode. According to the second prior art approach, the SDME technique is applied to the following traditional coding modes with a flag control bit to signal if SDME or the traditional MPEG-4 AVC Standard method is applied to derive the motion vector:

B_Skip, B_Direct_16×16, B_Bi_16×16
B_L0_Bi_16×8, B_L0_Bi_8×16, B_Bi_L0_16×8, B_Bi_L0_8×16,
B_L1_Bi_16×8, B_L1_Bi_8×16, B_Bi_L1_16×8, B_Bi_L1_8×16,
B_Bi_Bi_16×8, B_Bi_Bi_8×16.
B_Direct_8×8 (Use SDME directly for Direct_8×8. No flag bit is needed)

To improve motion vector accuracy, extended block size including the neighboring reconstructed pixels in the current picture into cost metric can be applied as shown in FIG. 2. Turning to FIG. 2, an example of a current block with available reconstructed neighboring blocks is indicated generally by the reference numeral 200. The example 200 involves the current block (so designated in FIG. 2) and neighboring blocks A0, A1, A2, and A3.

However, all of the prior art approaches involving SDME only apply SDME to the prediction of bi-predictive pictures.

SUMMARY

These and other drawbacks and disadvantages of the prior art are addressed by the present principles, which are directed to methods and apparatus for uni-prediction of self-derivation of motion estimation.

According to an aspect of the present principles, there is provided an apparatus. The apparatus includes a video encoder for encoding at least a portion of a picture. The video encoder includes a self derivation motion estimator for performing self derivation motion estimation for the portion. The self derivation motion estimation is used for selectively performing uni-prediction or bi-prediction for the portion based on one or more criterion.

According to another aspect of the present principles, there is provided a method in a video encoder. The method includes encoding at least a portion of a picture using self derivation motion estimation. The self derivation motion estimation is used for selectively performing uni-prediction or bi-prediction for the portion based on one or more criterion.

According to yet another aspect of the present principles, there is provided an apparatus. The apparatus includes a video decoder for decoding at least a portion of a picture. The video decoder includes a self derivation motion estimator for performing self derivation motion estimation for the portion. The self derivation motion estimation is used for selectively performing uni-prediction or bi-prediction for the portion based on one or more criterion.

According to still another aspect of the present principles, there is provided a method in a video decoder. The method includes decoding at least a portion of a picture using self derivation motion estimation. The self derivation motion estimation is used for selectively performing uni-prediction or bi-prediction for the portion based on one or more criterion.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
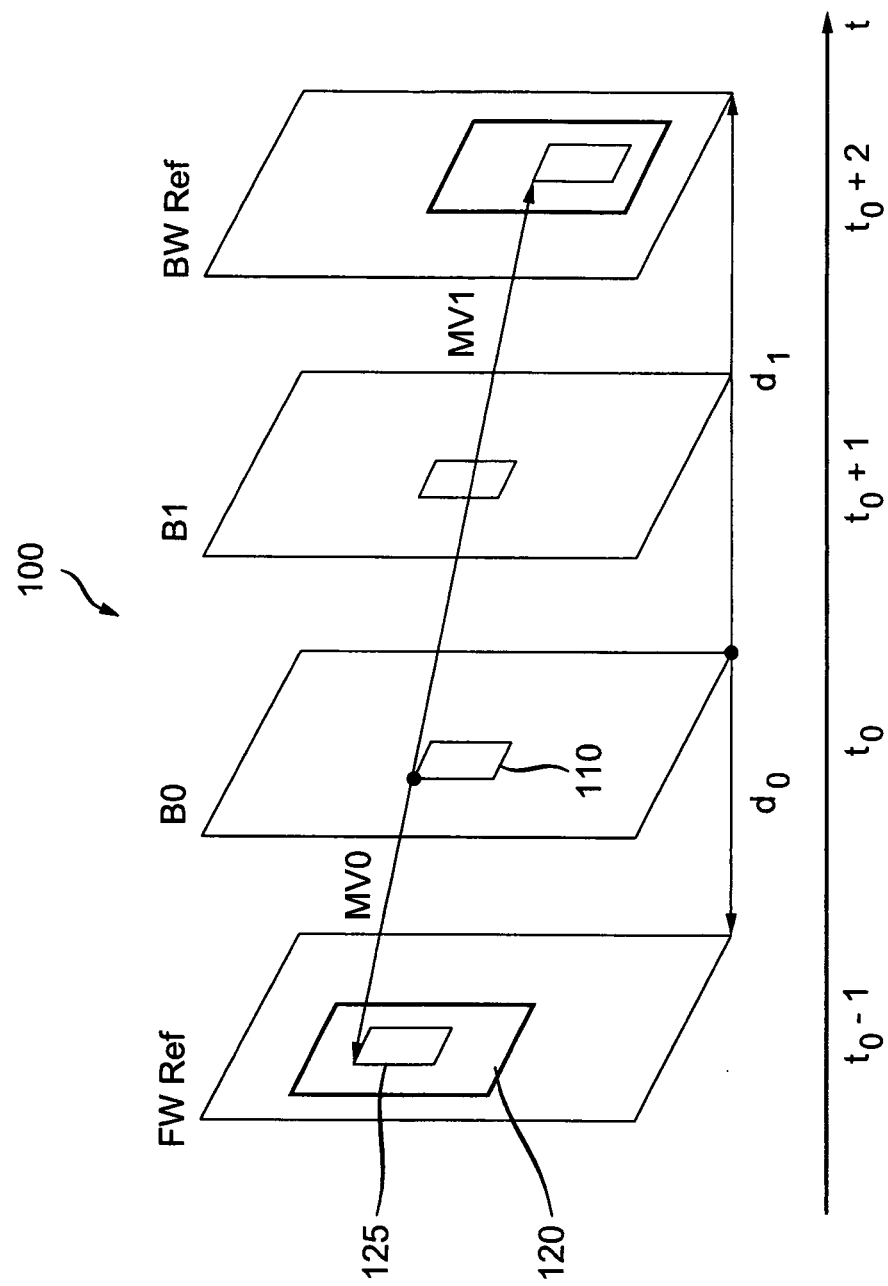
FIG. 1 is a diagram showing an example of how mirror motion estimation is performed for the scenario of two B pictures between two reference pictures L0 and L1.

The present principles are directed to methods and apparatus for uni-prediction of self-derivation of motion estimation.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and refer to a still image or a picture from a video sequence. As is known, a picture may be a frame or a field.

Additionally, as used herein, the phrase "information for reconstructed neighboring blocks" refers to information such as mode information, motion information, distortion, template matching results, and so forth. The phrase "mode information" refers to a size and a prediction method of a current block being encoded or decoded. Some examples of mode information include, but are not limited to, block size, block mode (inter prediction mode or intra prediction mode), transform size, transform matrix, and so forth. The phrase "motion information" refers to the motion of a block. Some examples of motion information include, but are not limited to, a motion vector, a motion vector predictor, the difference between a motion vector and a motion vector predictor, a reference frame index, a reference frame list (i.e., forward reference frame or backward reference frame), and so forth. The phrase "template", as used with respect to a current block being encoded or decoder, refers to reconstructed neighboring blocks of the current block. The phrase "template matching" refers to the comparison of the templates of two blocks.

For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions.

Figure 3:
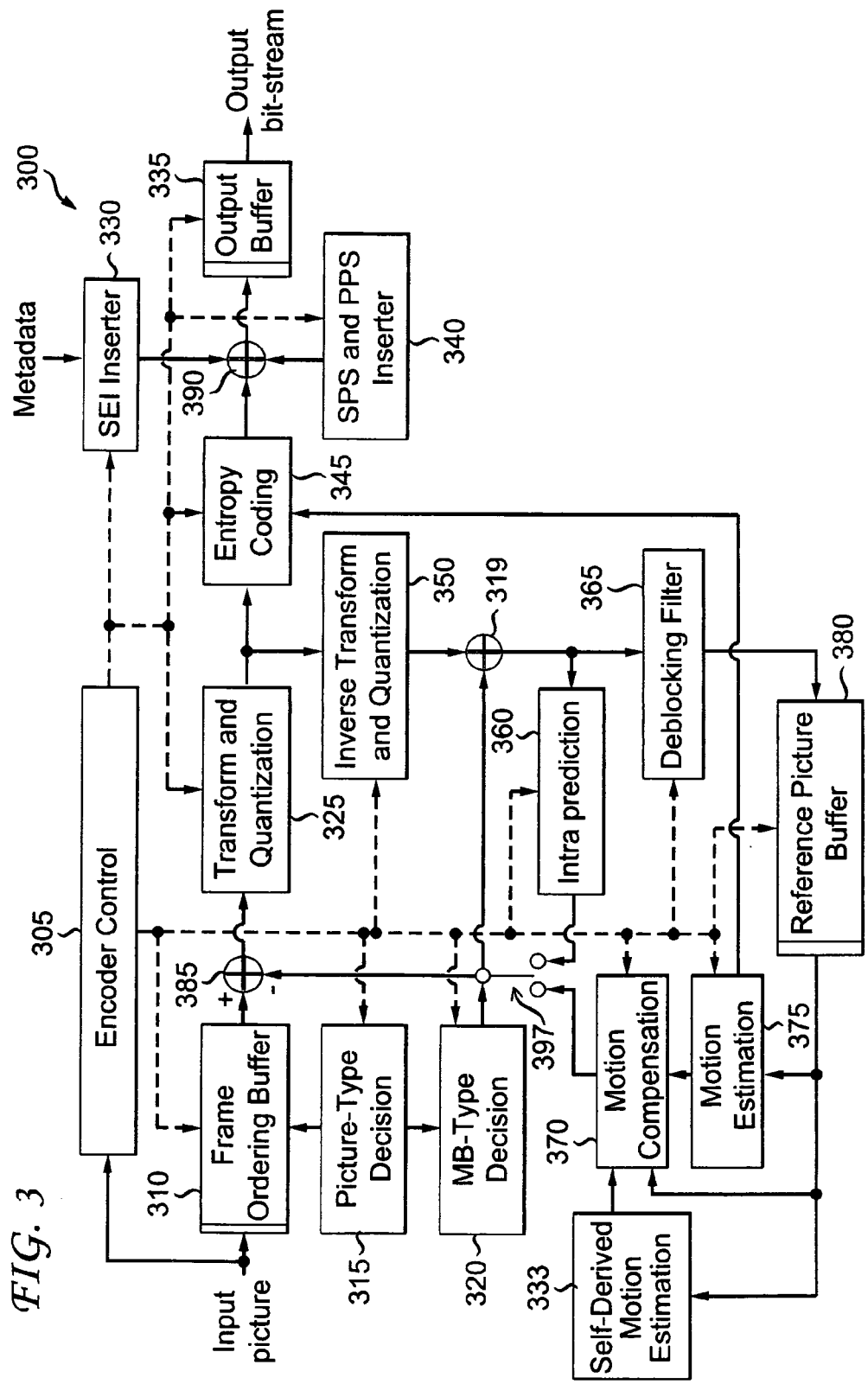
FIG. 3 is a block diagram showing an exemplary video encoder with self derivation of motion estimation (SDME) to which the present principles may be applied, in accordance with an embodiment of the present principles.

Turning to FIG. 3, an exemplary video encoder with self derivation of motion estimation (SDME) to which the present principles may be applied is indicated generally by the reference numeral 300. The video encoder 300 includes a frame ordering buffer 310 having an output in signal communication with a non-inverting input of a combiner 385. An output of the combiner 385 is connected in signal communication with a first input of a transformer and quantizer 325. An output of the transformer and quantizer 325 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the transformer and quantizer 325, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375, a third input of the motion compensator 370, and an input of a self derived motion estimator 333. An output of the self derived motion estimator 333 is connected in signal communication with a fourth input of the motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310 and an input of the encoder controller 305 are available as inputs of the encoder 300, for receiving an input picture. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

Figure 4:
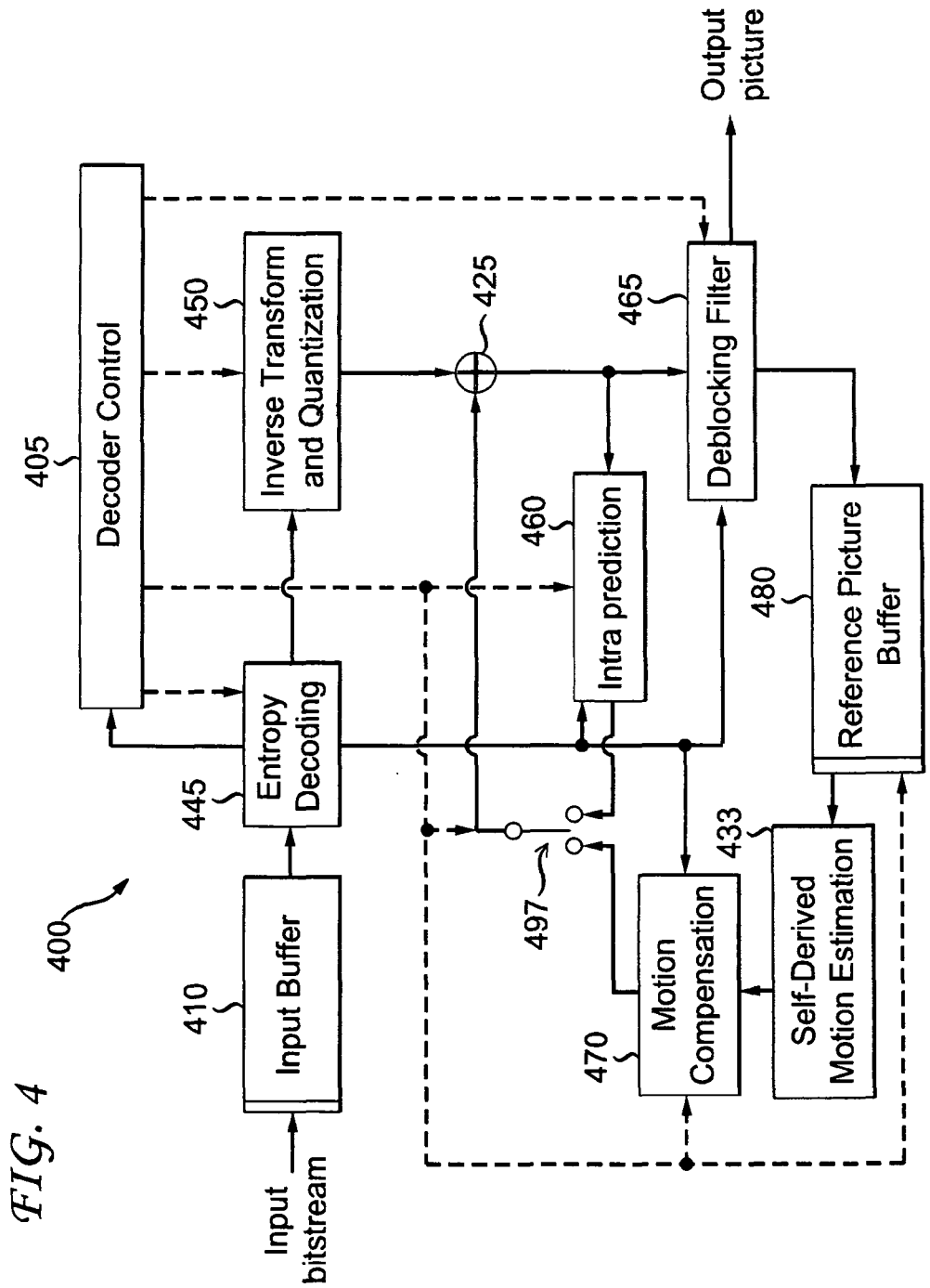
FIG. 4 is a block diagram showing an exemplary video decoder with self derivation of motion estimation (SDME) to which the present principles may be applied, in accordance with an embodiment of the present principles.

Turning to FIG. 4, an exemplary video decoder with self derivation of motion estimation (SDME) to which the present principles may be applied is indicated generally by the reference numeral 400. The video decoder 400 includes an input buffer 410 having an output connected in signal communication with a first input of an entropy decoder 445. A first output of the entropy decoder 445 is connected in signal communication with a first input of an inverse transformer and inverse quantizer 450. An output of the inverse transformer and inverse quantizer 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. A second output of the reference picture buffer 480 is connected in signal communication with a second input of a motion compensator 470. A first output of the reference picture buffer 480 is connected in signal communication with an input of a self derived motion estimator 433. An output of the self derived motion estimator 433 is connected in signal communication with a fourth input of the motion compensator 470.

A second output of the entropy decoder 445 is connected in signal communication with a third input of the motion compensator 470, a first input of the deblocking filter 465, and a third input of the intra predictor 460. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer 450. A third output of the decoder controller 405 is connected in signal communication with a third input of the deblocking filter 465. A fourth output of the decoder controller 405 is connected in signal communication with a second input of the intra prediction module 460, a first input of the motion compensator 470, and a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

As noted above, the present principles are directed to methods and apparatus for uni-prediction of self-derivation of motion estimation (SDME). As further noted above, SDME is a process in video encoding and decoding in which motion vector information is derived at the decoder, rather than specifically transmitted or otherwise conveyed from encoder to decoder. Since the transmission or conveyance of motion vector information from video encoder side to video decoder side is skipped, a higher coding efficiency is achieved. In state of the art coding schemes, SDME is performed only for the bi-predictive mode (or B prediction). However, it is known that P prediction (uni-prediction or uni-direction prediction) may be a better choice if there is an occlusion or un-covered area. This limitation has been recognized and a scheme has been created accordingly that can perform SDME for P prediction (uni-prediction or uni-direction prediction). The methods described in accordance with the present principles herein can be applied to all inter prediction modes and in both P and B pictures.

The basic idea is to perform motion estimation (ME) to find a pair of reference blocks with minimum distortion. As previously mentioned, in the prior art, SDME was previously only applied to bi-prediction mode for B pictures. In accordance with the present principles, we propose new methods to apply SDME to a uni-prediction mode. Thus, in accordance with the present principles, SDME can be applied to both P and B pictures. In the past, even though two motion vectors have been used to derive SDME, the average of two predictions is not always the best due to occlusion or un-covered areas. Thus, we have recognized this limitation and have created methods and apparatus that allow for only one prediction case (should that be deemed preferable). The prediction selection can be signaled explicitly or implicitly.

Explicit Signaling between uni-prediction or bi-prediction SDME

Embodiment 1

In one embodiment, we can explicitly select which is better, i.e., uni-prediction or bi-prediction, based on the cost of distortion (e.g., SAD) of the set $\{SAD(T,R_0), SAD(T,R_1), SAD(T,\text{average of } (R_0+R_1)\}$. In one example, we can apply our method to partitions larger than 8×8. For B_Direct_16× 16, we can use a Huffman tree to signal which method is used, choosing among $\{H.264\_Bi, SDME\_Bi, SDME\_L0, SDME\_L1\}$ as shown in TABLE 1. TABLE 1 shows exemplary syntax elements for mode indication for B_direct_16× 16, in accordance with an embodiment of the present principles.

TABLE 1

| Mode | Huffman tree |
|---|---|
| H.264_Bi | 0 |
| SDME_Bi | 10 |
| SDME_L0 | 110 |
| SDME_L1 | 111 |

The semantics of some of the syntax elements shown in TABLE 1 are as follows:

SDME_Bi denotes using the average of $(R_0+R_1)$.
SDME_L0 denotes using $R_0$.
SDME_L1 denotes using $R_1$.

For other modes, we can use the MPEG-4 AVC Standard coding modes with a flag to signal if SDME or the MPEG-4 AVC Standard method is used. For example, B_Bi_16×16 with the flag set to 1 denotes that SDME_Bi is applied to a 16×16 partition, B_Bi_16×16 with the flag set to 0 denotes that the MPEG-4 AVC Standard H.264_Bi method is applied to a 16×16 partition. B_L0_16×16 with the flag set to 1 denotes that SDME_L0 is applied to a 16×16 partition, B_L0_16×16 with the flag set to 0 denotes that the MPEG-4 AVC Standard H.264_L0 method is applied to a 16×16 partition. B_L1_16×16 with the flag set to 1 denotes that SDME_L1 is applied to a 16×16 partition, B_L1_16×16 with the flag set to 0 denotes that the MPEG-4 AVC Standard H.264_L1 method is applied to a 16×16 partition.

Figure 6:
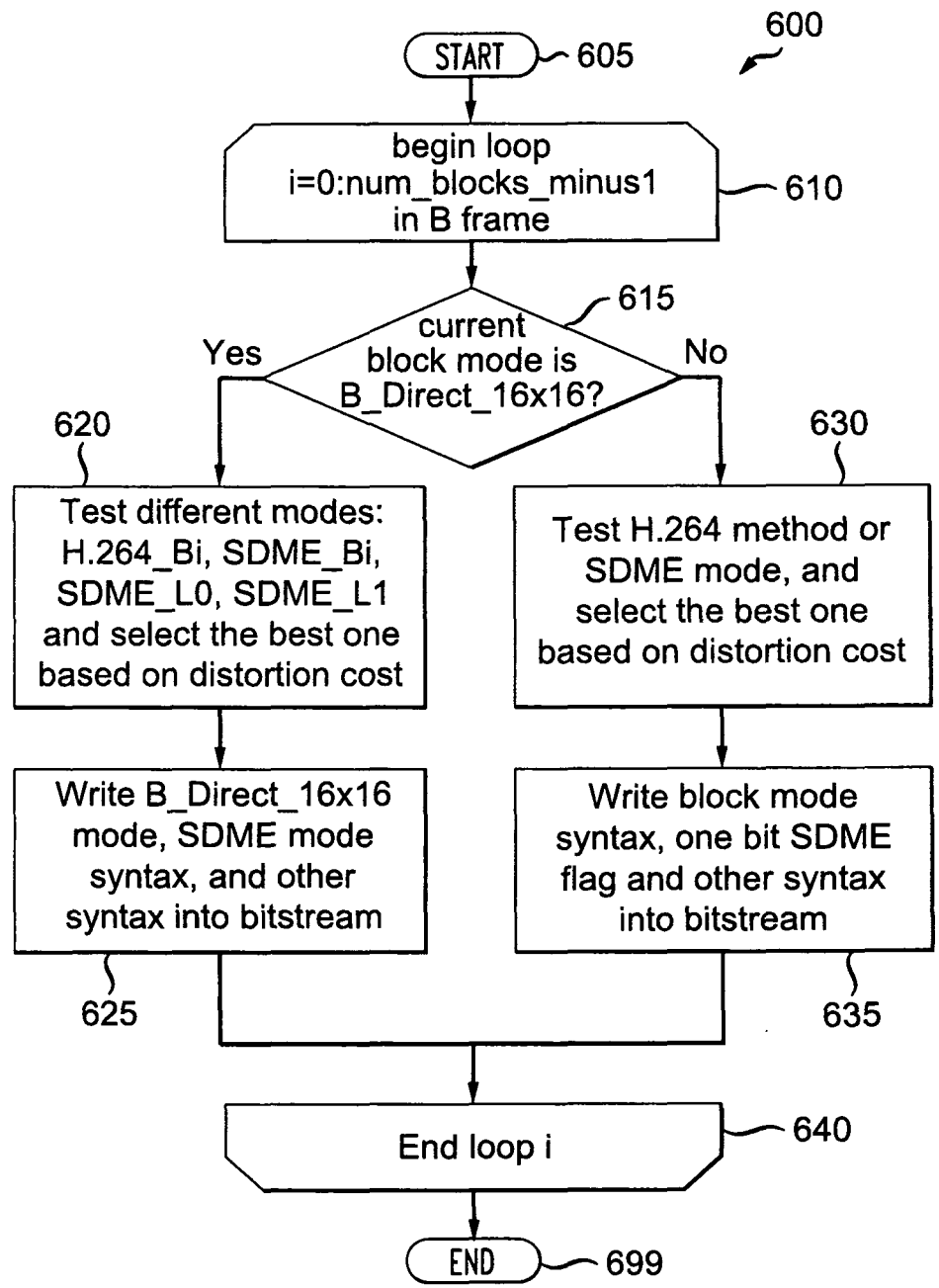
FIG. 6 is a flow diagram showing an exemplary method for uni-prediction of self derivation of motion estimation in a video encoder, in accordance with an embodiment of the present principles.

Turning to FIG. 6, an exemplary method for uni-prediction of self derivation of motion estimation in a video encoder is indicated generally by the reference numeral 600. The method 600 corresponds to Embodiment 1 described herein. The method 600 includes a start block 605 that passes control to a loop limit block 610. The loop limit block 610 begins a loop using a variable i having a value from 0 to num_blocks_minus1 in B frame, and passes control to a decision block 615. The decision block 615 determines whether or not the current block mode is B_Direct_16×16. If so, then control is passed to a function block 620. Otherwise, control is passed to a function block 630. The function block 620 tests different modes (e.g., H.264_Bi, SDME_Bi, SDME_L0, SDME_L1), selects the best mode based on distortion cost, and passes control to a function block 625. The function block 625 writes B_direct_16×16 mode, SDME mode syntax, and other syntax into a bitstream, and passes control to a loop limit block 640. The loop limit block 640 ends the loop, and passes control to an end block 699. The function block 630 tests the H.264 method or the SDME mode, selects the best mode based on distortion cost, and passes control to a function block 635. The function block 635 writes block mode syntax, a one bit SDME flag, and other syntax into a bitstream, and passes control to the loop limit block 640.

Figure 7:
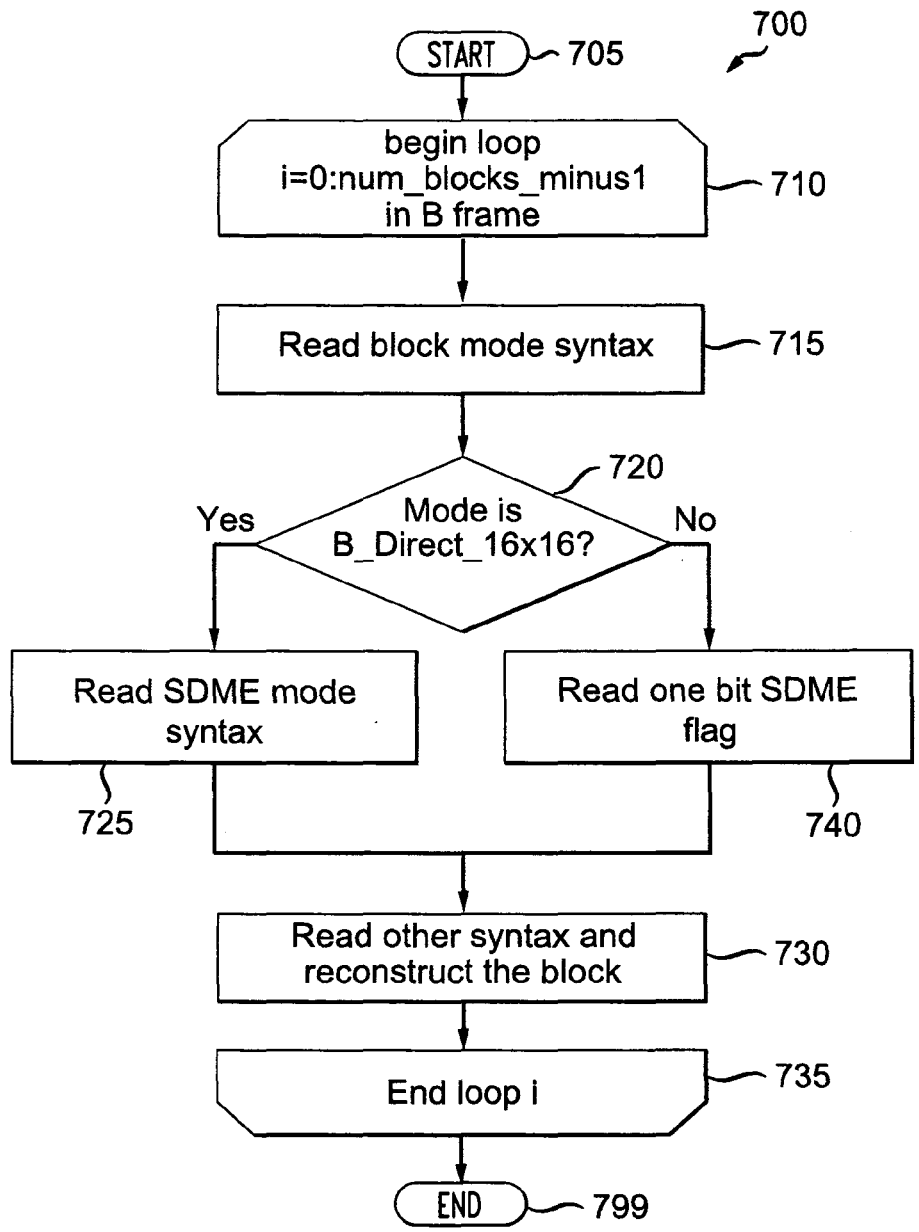
FIG. 7 is a flow diagram showing an exemplary method for uni-prediction of self derivation of motion estimation in a video decoder, in accordance with an embodiment of the present principles.

Turning to FIG. 7, an exemplary method for uni-prediction of self derivation of motion estimation in a video decoder is indicated generally by the reference numeral 700. The method 700 corresponds to Embodiment 1 described herein. The method 700 includes a start block 705 that passes control to a loop limit block 710. The loop limit block 710 begins a loop using a variable i having a value from 0 to num_blocks_minus1 in B frame, and passes control to a function block 715. The function block 715 reads block mode syntax, and passes control to a decision block 720. The decision block 720 determines whether or not the current mode is B_Direct_16×16. If so, then control is passed to a function block 725. Otherwise, control is passed to a function block 740. The function block 725 reads the SDME mode syntax, and passes control to a function block 730. The function block 730 reads other syntax, reconstructs the block, and passes control to a loop limit block 735. The loop limit block 735 ends the loop, and passes control to an end block 799. The function block 740 reads a one bit SDME flag, and passes control to the function block 730.

Implicit Signaling Between Uni-Prediction or Bi-Prediction SDME

Embodiment 2

Figure 2:
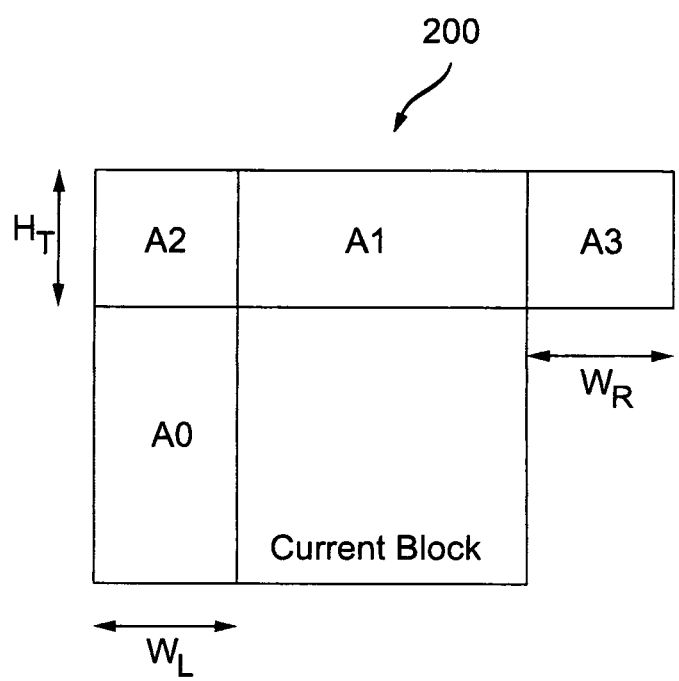
FIG. 2 is a diagram showing an example of a current block with available reconstructed neighboring blocks.

In one embodiment, the decoder can derive the uni-prediction or bi-prediction implicitly. The derivation can be based on the information of reconstructed neighboring blocks, such as mode information, motion information, and so forth. In one embodiment, we can compare MV0 and MV1 with the motion vector predictor in the MPEG-4 AVC Standard. If the differences of both motion vectors are less than a threshold or neither of the motion vector is less than a threshold, then SDME_Bi is used. Otherwise, the List (L0 or L1) with the motion vector less than a threshold is used. In another embodiment, since extended block size with neighboring reconstructed pixels is used (as shown in FIG. 2), we can use the distortion of neighboring reconstructed pixels to decide Bi or L0, L1 should be used. For example, the one with minimum SAD should be used. We call this method template matching.

Figure 8:
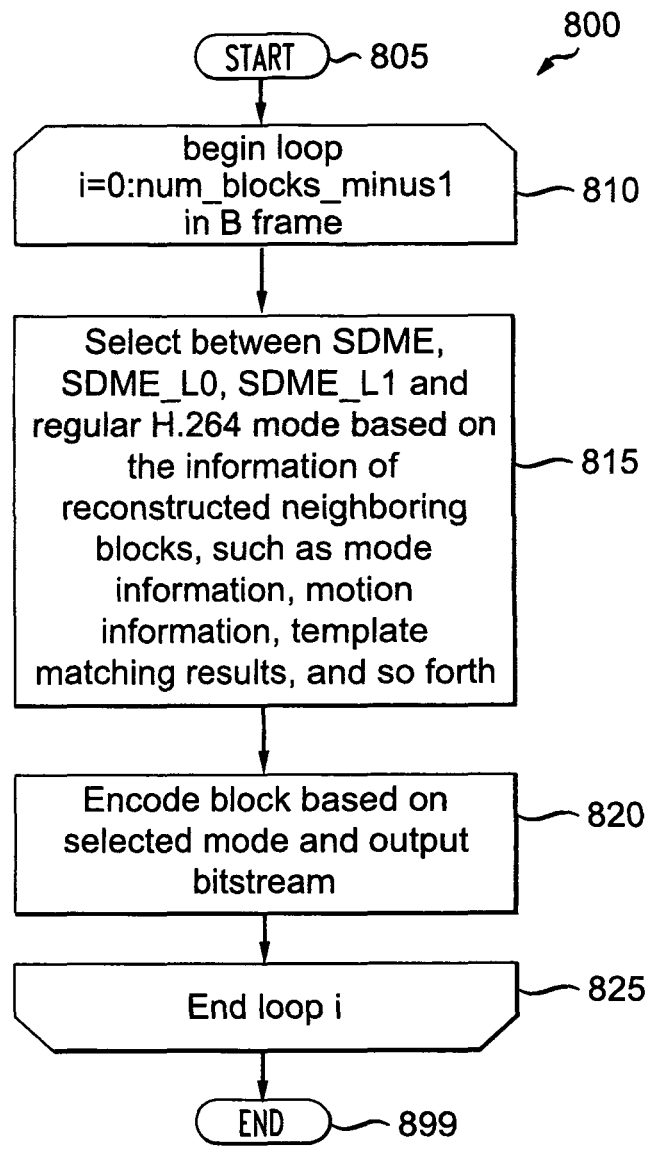
FIG. 8 is a flow diagram showing another exemplary method for uni-prediction of self derivation of motion estimation in a video encoder, in accordance with an embodiment of the present principles.

Turning to FIG. 8, another exemplary method for uni-prediction of self derivation of motion estimation in a video encoder is indicated generally by the reference numeral 800. The method 800 corresponds to Embodiment 2 described herein. The method 800 includes a start block 805 that passes control to a loop limit block 810. The loop limit block 810 begins a loop using a variable i having a value from 0 to num_blocks_minus1 in B frame, and passes control to a function block 815. The function block 815 selects between SDME, SDME_L0, SDME_L1, and regular H.264 mode based on the information of reconstructed neighboring blocks, such as mode information, motion information, template matching results, and so forth, and passes control to a function block 820. The function block 820 encodes the current block based on the selected mode, outputs a bitstream, and passes control to a loop limit block 825. The loop limit block 825 ends the loop, and passes control to an end block 899.

Figure 9:
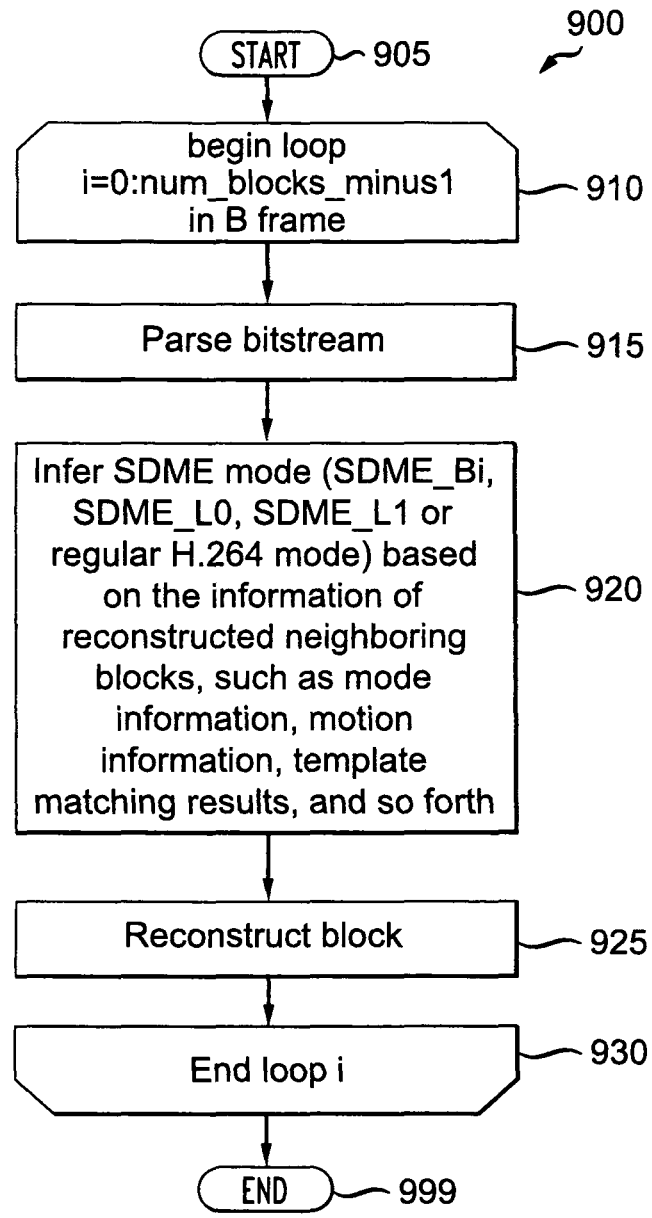
FIG. 9 is a flow diagram showing another exemplary method for uni-prediction of self derivation of motion estimation in a video decoder, in accordance with an embodiment of the present principles.

Turning to FIG. 9, another exemplary method for uni-prediction of self derivation of motion estimation in a video decoder is indicated generally by the reference numeral 900. The method 900 corresponds to Embodiment 2 described herein. The method 900 includes a start block 905 that passes control to a loop limit block 910. The loop limit block 910 begins a loop using a variable i having a value from 0 to num_blocks_minus1 in B frame, and passes control to a function block 915. The function block 915 parses a bitstream, and passes control to a function block 920. The function block 920 infers SDME mode (SDME_Bi, SDME_L0, SDME_L1, or regular H.264 mode) based on information of reconstructed neighboring blocks, such as mode information, motion information, template matching results, and so forth, and passes control to a function block 925. The function block 925 reconstructs the current block, and passes control to a loop limit block 930. The loop limit block 930 ends the loop, and passes control to an end block 999.

Embodiment 3

In one embodiment, the implicit derivation can be used for all modes. In this way, we keep the same signaling as in the second prior art approach, but SDME can be SDME_Bi, SDME_L0, SDME_L1 using implicit derivation. In another embodiment, the implicit derivation can be mixed together with explicit signaling. For example, the implicit derivation is only used for B_direct_16×16. In this way, one flag can be uniformly used for all partition modes.

Figure 10:
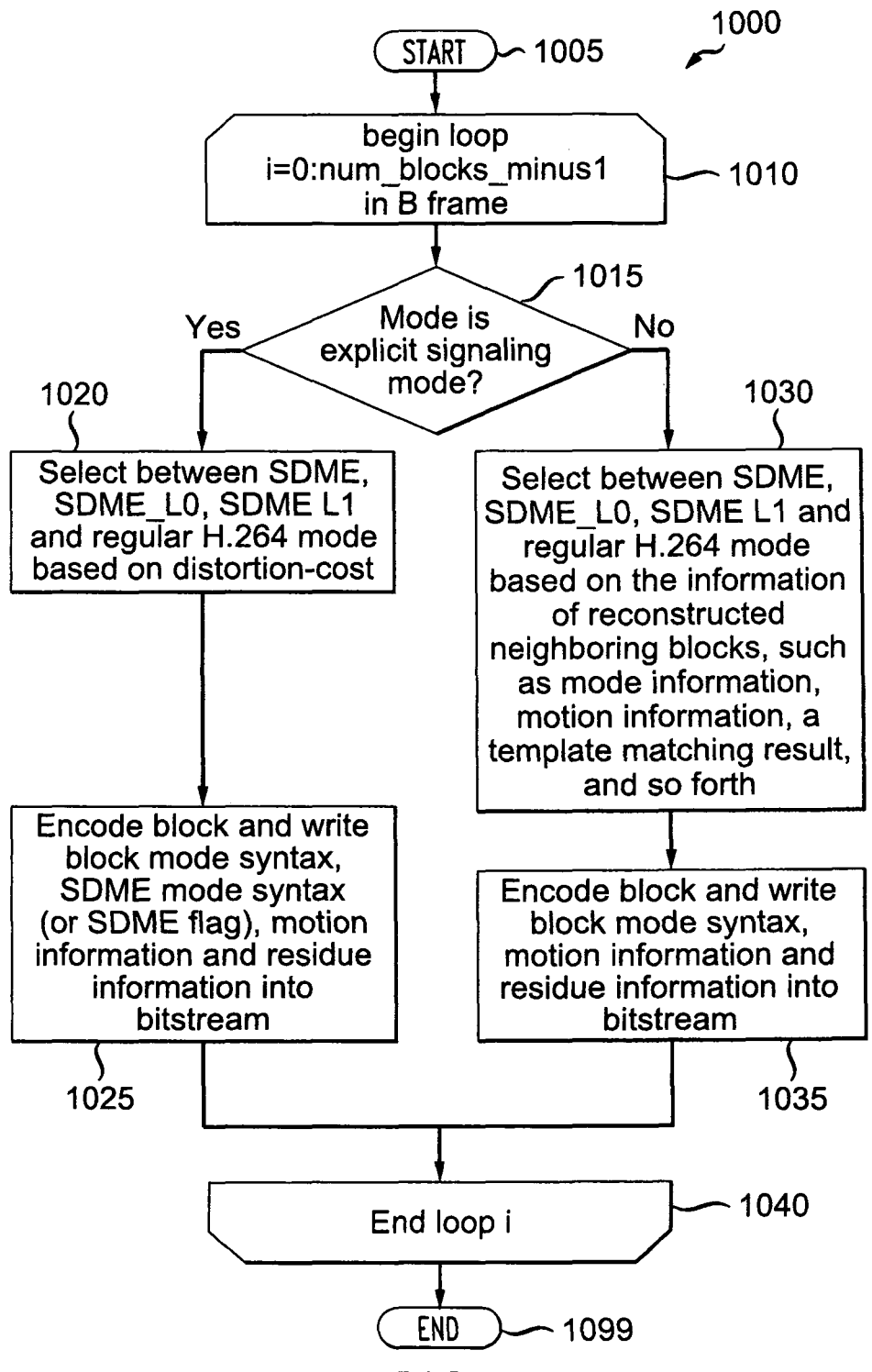
FIG. 10 is a flow diagram showing yet another exemplary method for uni-prediction of self derivation of motion estimation in a video encoder, in accordance with an embodiment of the present principles.

Turning to FIG. 10, yet another exemplary method for uni-prediction of self derivation of motion estimation in a video encoder is indicated generally by the reference numeral 1000. The method 1000 corresponds to Embodiment 3 described herein. The method 1000 includes a start block 1005 that passes control to a loop limit block 1010. The loop limit block 1010 begins a loop using a variable i having a value from 0 to num_blocks_minus1 in B frame, and passes control to a decision block 1015. The decision block 1015 determines whether or not the current mode is the explicit signaling mode. If so, then control is passed to a function block 1020. Otherwise, control is passed to a function block 1030. The function block 1020 selects between SDME, SDME_L0, SDME_L1, and regular H.264 mode based on distortion cost, and passes control to a function block 1025. The function block 1025 encodes the current block, writes the block mode syntax, SDME mode syntax (or SDME flag), motion information, and residue information into a bitstream, and passes control to a loop limit block 1040. The function block 1030 selects between SDME, SDME_L0, SDME_L1 and regular H.264 mode based on the information of reconstructed neighboring blocks, such as mode information, motion information, a template matching result, and so forth, and passes control to a function block 1035. The function block 1035 encodes the current block, writes the block mode syntax, motion information, and residue information into a bitstream, and passes control to a loop limit block 1040. The loop limit block 1040 ends the loop, and passes control to an end block 1099.

Figure 11:
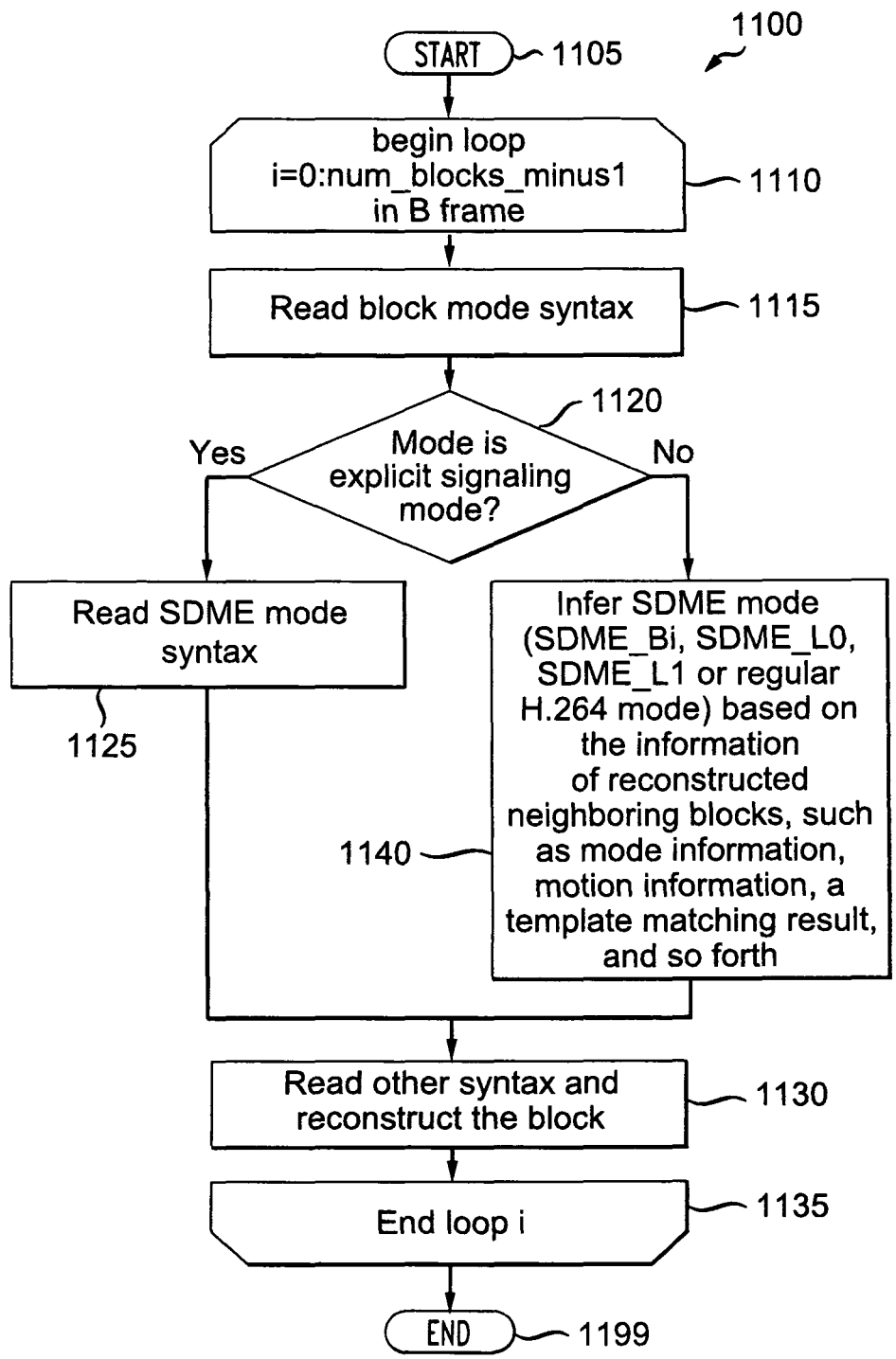
FIG. 11 is a flow diagram showing yet another exemplary method for uni-prediction of self derivation of motion estimation in a video decoder, in accordance with an embodiment of the present principles.

Turning to FIG. 11, yet another exemplary method for uni-prediction of self derivation of motion estimation in a video decoder is indicated generally by the reference numeral 1100. The method 1100 corresponds to Embodiment 3 described herein. The method 1100 includes a start block 1105 that passes control to a loop limit block 1110. The loop limit block 1110 begins a loop using a variable i having a value from 0 to num_blocks_minus1 in B frame, and passes control to a function block 1115. The function block 1115 reads the block mode syntax, and passes control to a decision block 1120. The decision block 1120 determines whether or not the current mode is the explicit signaling mode. If so, then control is passed to a function block 1125. Otherwise, control is passed to a function block 1140. The function block 1125 reads the SDME mode syntax, and passes control to a function block 1130. The function block 1130 reads other syntax, reconstructs the current block, and passes control to a loop limit block 1135. The loop limit block 1135 ends the loop, and passes control to an end block 1199. The function block 1140 infers SDME mode (e.g., SDME_Bi, SDME_L0, SDME_L1, or regular H.264 mode) based on the information of reconstructed neighboring blocks, such as mode information, motion information, a template matching result, and so forth, and passes control to the function block 1130.

Extension to P frame

Embodiment 4

Figure 5:
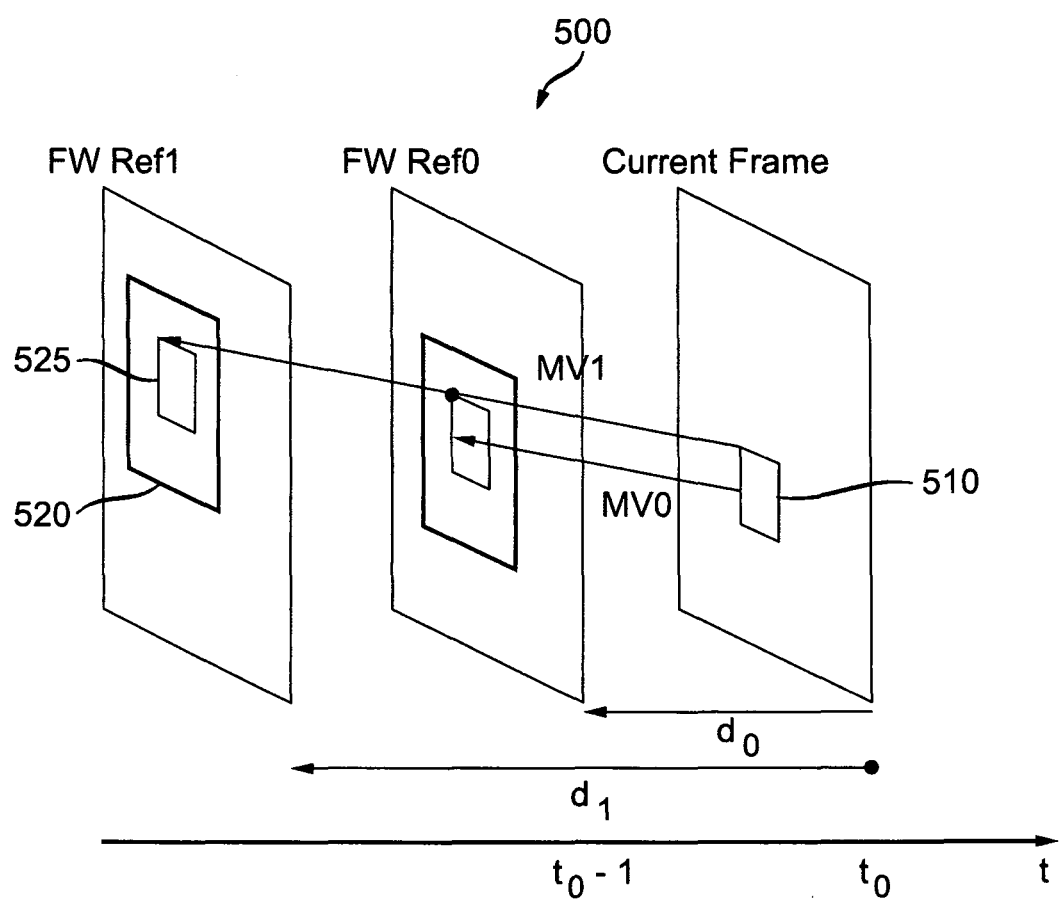
FIG. 5 is a diagram showing an example of mirror motion estimation (ME) at the decoder side for a P picture, in accordance with an embodiment of the present principles.

The idea can be extended to P pictures as well. The MPEG-4 AVC Standard supports multiple reference pictures. Without losing generality, the first picture in L0 is the one which is closest to the current picture. Thus, we can always presume MV0 is from the first picture in L0 and MV1 is from other reference picture, as shown in FIG. 5. The same algorithm as in B picture can be applied. Turning to FIG. 5, an example of mirror motion estimation (ME) at the decoder side for a P picture is indicated generally by the reference numeral 500. The example 500 involves a current frame (so designated), a reference picture FW Ref0, and a reference picture FW Ref1. A motion vector between the current frame and FW Ref0 is denoted by MV0, and a motion vector between the current frame and FW Ref1 is denoted by MV1. The current frame includes a current or target block 510. The reference picture FW Ref1 (as well as reference picture FW Ref0, although not explicitly shown there for) includes a search window 520 and a reference (ref) block 525 within the search window 520.

Figure 12:
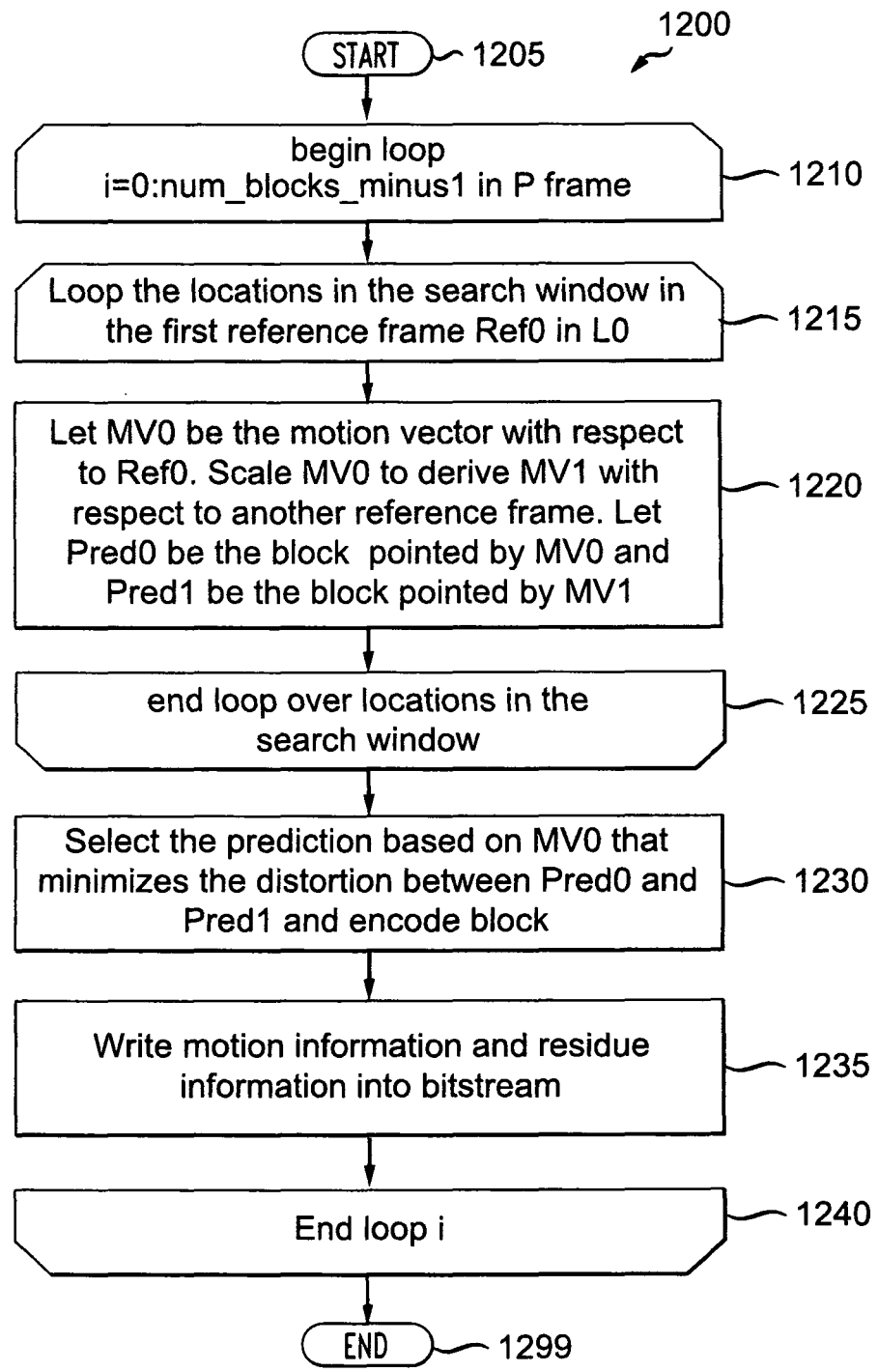
FIG. 12 is a flow diagram showing still another exemplary method for uni-prediction of self derivation of motion estimation in a video encoder, in accordance with an embodiment of the present principles.

Turning to FIG. 12, still another exemplary method for uni-prediction of self derivation of motion estimation in a video encoder is indicated generally by the reference numeral 1200. The method 1200 corresponds to Embodiment 4 described herein. The method 1200 includes a start block 1205 that passes control to a loop limit block 1210. The loop limit block 1210 begins a first loop using a variable i having a value from 0 to num_blocks_minus1 in P frame, and passes control to a loop limit block 1215. The loop limit block 1215 begins a second loop over the locations in a search window in the first reference frame Ref0 in L0, and passes control to a function block 1220. The function block 1220 lets MV0 be the motion vector with respect to Ref0, scales MV0 to derive MV1 with respect to another reference frame, lets Pred0 be the block pointed to by MV0, lets Pred1 be the block pointed to by MV1, and passes control to a loop limit block 1225. The loop limit block 1225 ends the loop over the locations in the search window, and passes control to a function block 1230. The function block 1230 selects the prediction based on MV0 that minimizes the distortion between Pred0 and Pred1, encodes the current block, and passes control to a function block 1235. The function block 1235 encodes the block, writes motion information and residue information into a bitstream, and passes control to a loop limit block 1240. The loop limit block 1240 ends the loop over the blocks in the frame, and passes control to an end block 1299.

Figure 13:
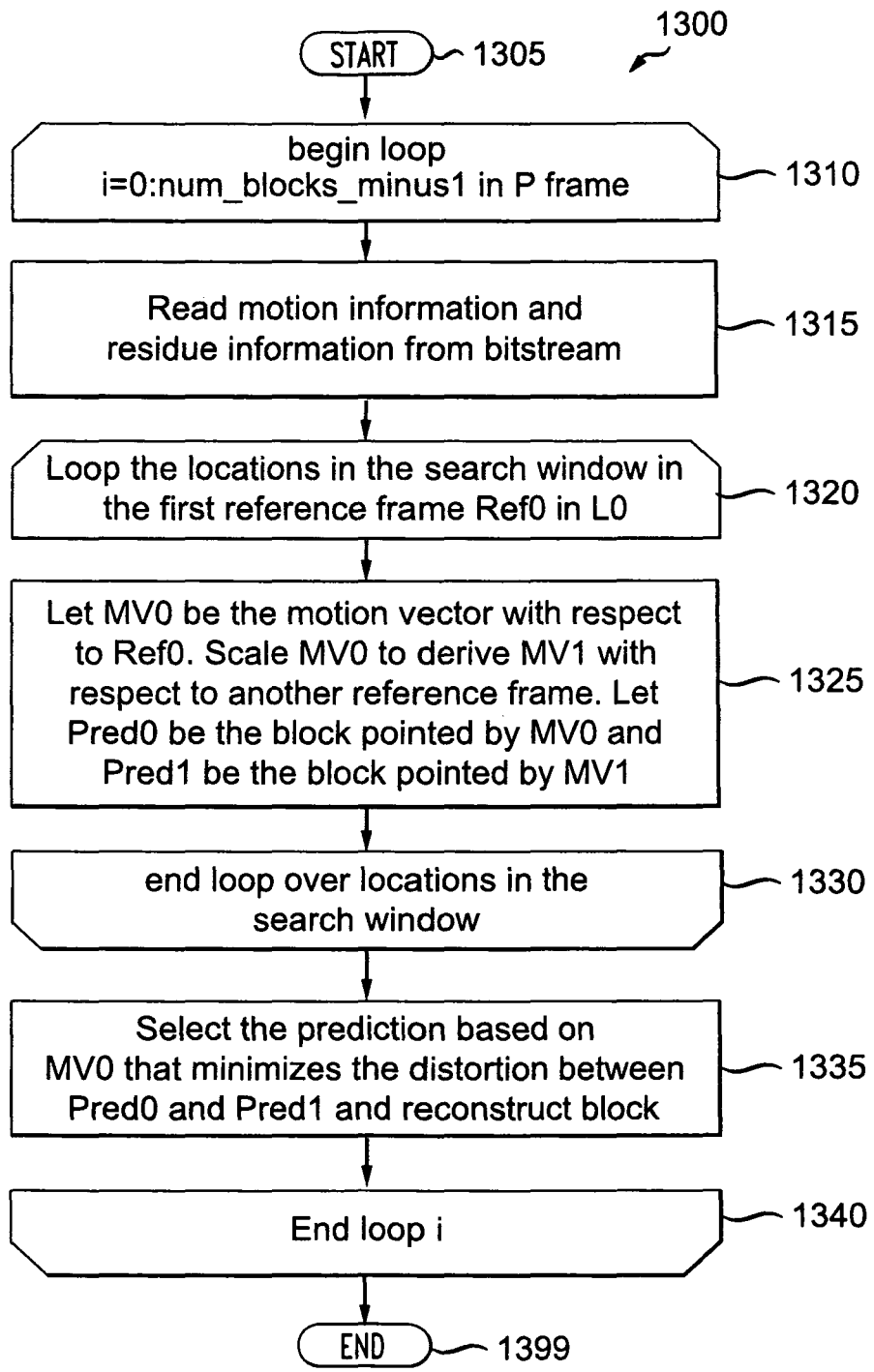
FIG. 13 is a flow diagram showing still another exemplary method for uni-prediction of self derivation of motion estimation in a video decoder, in accordance with an embodiment of the present principles.

Turning to FIG. 13, still another exemplary method for uni-prediction of self derivation of motion estimation in a video decoder is indicated generally by the reference numeral 1300. The method 1300 corresponds to Embodiment 4 described herein. The method 1300 includes a start block 1305 that passes control to a loop limit block 1310. The loop limit block 1310 begins a first loop using a variable i having a value from 0 to num_blocks_minus1 in P frame, and passes control to a function block 1315. The function block 1315 reads motion information and residue information from a bitstream, and passes control to a loop limit block 1320. The loop limit block 1320 begins a second loop over the locations in a search window in the first reference frame Ref0 in L0, and passes control to a function block 1325. The function block 1325 lets MV0 be the motion vector with respect to Ref0, scales MV0 to derive MV1 with respect to another reference frame, lets Pred0 be the block pointed to by MV0, lets Pred1 be the block pointed to by MV1, and passes control to a loop limit block 1330. The loop limit block 1330 ends the loop over the locations in the search window, and passes control to a function block 1335. The function block 1335 selects the prediction based on MV0 that minimizes the distortion between Pred0 and Pred1, reconstructs the current block, and passes control to a loop limit block 1340. The loop limit block 1340 ends the loop over the blocks in the frame, and passes control to an end block 1399.

Embodiment 5

In another embodiment, we can signal the ref_idx to indicate which motion vector (MV) is used.

Figure 14:
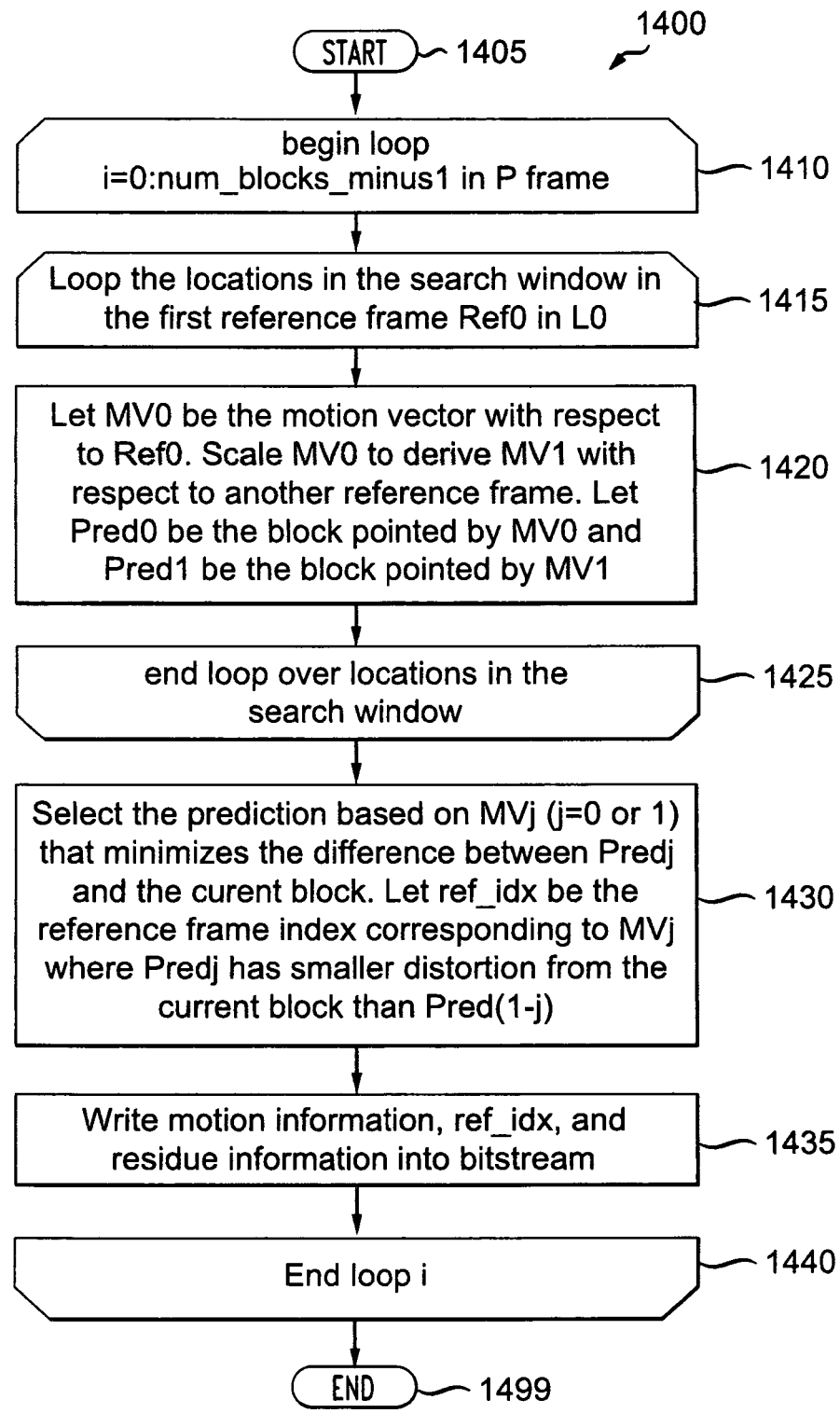
FIG. 14 is a flow diagram showing a further exemplary method for uni-prediction of self derivation of motion estimation in a video encoder, in accordance with an embodiment of the present principles.

Turning to FIG. 14, a further exemplary method for uni-prediction of self derivation of motion estimation in a video encoder is indicated generally by the reference numeral 1400. The method 1400 corresponds to Embodiment 5 described herein. The method 1400 includes a start block 1405 that passes control to a loop limit block 1410. The loop limit block 1410 begins a first loop using a variable i having a value from 0 to num_blocks_minus1 in P frame, and passes control to a loop limit block 1415. The loop limit block 1415 begins a second loop over the locations in a search window in the first reference frame Ref0 in L0, and passes control to a function block 1420. The function block 1420 lets MV0 be the motion vector with respect to Ref0, scales MV0 to derive MV1 with respect to another reference frame, lets Pred0 be the block pointed to by MV0, lets Pred1 be the block pointed to by MV1, and passes control to a loop limit block 1425. The loop limit block 1425 ends the loop over the locations in the search window, and passes control to a function block 1430. The function block 1430 selects the prediction based on MVj (j=0 or 1) that minimizes the difference between Pred0 and Pred1, lets ref_idx be the reference frame index corresponding to MVj where Predj has a smaller distortion from the current block than Pred(1-j), and passes control to a function block 1435. The function block 1435 encodes the block and writes motion information, ref_idx, and residue information into a bitstream, and passes control to a loop limit block 1440. The loop limit block 1440 ends the loop over the blocks in the frame, and passes control to an end block 1499.

Figure 15:
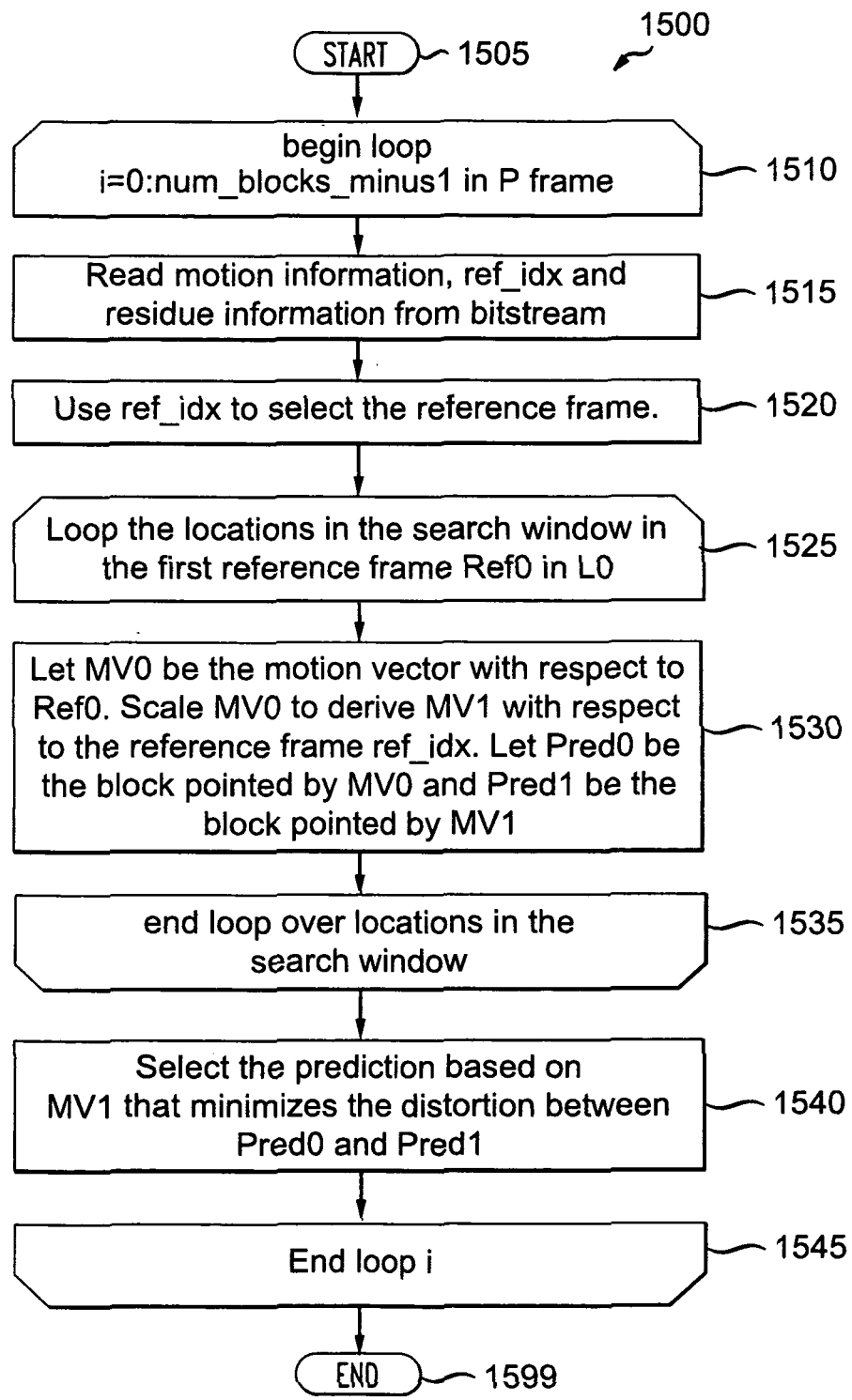
FIG. 15 is a flow diagram showing a further exemplary method for uni-prediction of self derivation of motion estimation in a video decoder, in accordance with an embodiment of the present principles.

Turning to FIG. 15, a further exemplary method for uni-prediction of self derivation of motion estimation in a video decoder is indicated generally by the reference numeral 1500. The method 1500 corresponds to Embodiment 5 described herein. The method 1500 includes a start block 1505 that passes control to a loop limit block 1510. The loop limit block 1510 begins a first loop using a variable i having a value from 0 to num_blocks_minus1 in P frame, and passes control to a function block 1515. The function block 1515 reads motion information, ref_idx, and residue information from a bitstream, and passes control to a function block 1520. The function block 1520 uses ref_idx to select the reference frame, and passes control to a loop limit block 1525. The loop limit block 1525 begins a second loop over the locations in a search window in the first reference frame Ref0 in L0, and passes control to a function block 1530. The function block 1530 lets MV0 be the motion vector with respect to Ref0, scales MV0 to derive MV1 with respect to another reference frame ref_idx, lets Pred0 be the block pointed to by MV0, lets Pred1 be the block pointed to by MV1, and passes control to a loop limit block 1535. The loop limit block 1535 ends the loop over the locations in the search window, and passes control to a function block 1540. The function block 1540 selects the prediction based on MV1 that minimizes the distortion between Pred0 and Pred 1, reconstructs the current block, and passes control to a loop limit block 1545. The loop limit block 1545 ends the loop over the blocks in the frame, and passes control to end block 1599.

Embodiment 6

In another embodiment, we can implicitly derive which motion vector is used by template matching.

Figure 16:
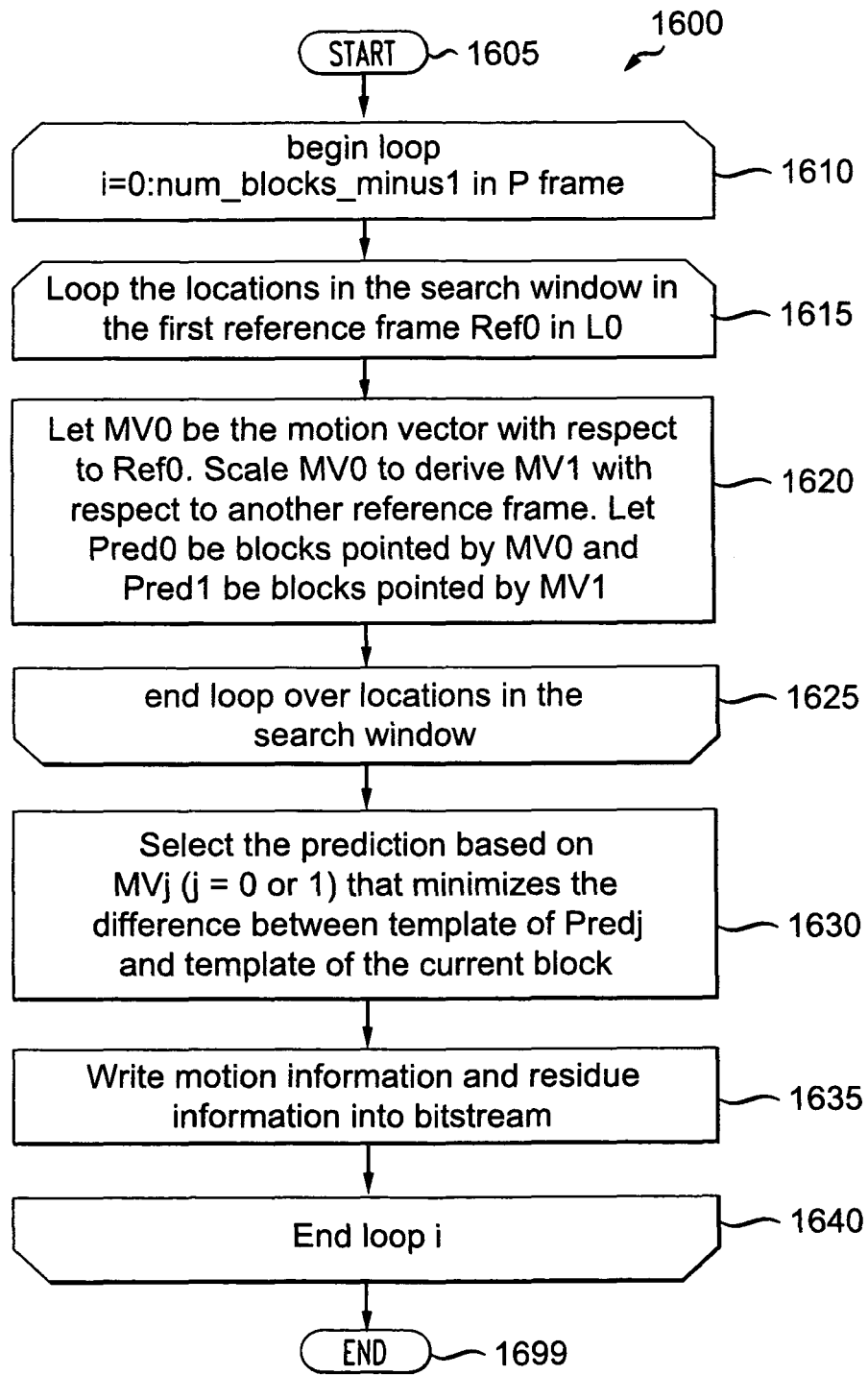
FIG. 16 is a flow diagram showing another exemplary method for uni-prediction of self derivation of motion estimation in a video encoder, in accordance with an embodiment of the present principles.

Turning to FIG. 16, another exemplary method for uni-prediction of self derivation of motion estimation in a video encoder is indicated generally by the reference numeral 1600. The method 1600 corresponds to Embodiment 6 described herein. The method 1600 includes a start block 1605 that passes control to a loop limit block 1610. The loop limit block 1610 begins a first loop using a variable i having a value from 0 to num_blocks_minus1 in P frame, and passes control to a loop limit block 1615. The loop limit block 1615 begins a second loop over the locations in a search window in the first reference frame Ref0 in L0, and passes control to a function block 1620. The function block 1620 lets MV0 be the motion vector with respect to Ref0, scales MV0 to derive MV1 with respect to another reference frame, lets Pred0 be the block pointed to by MV0, lets Pred1 be the block pointed to by MV1, and passes control to a loop limit block 1625. The loop limit block 1625 ends the loop over the locations in the search window, and passes control to a function block 1630. The function block 1630 selects the prediction based on MVj (j=0 or 1) that minimizes the distortion between the template of Predj and the template of the current block, and passes control to a function block 1635. The function block 1635 encodes the block, writes motion information and residue information into a bitstream, and passes control to a loop limit block 1640. The loop limit block 1640 ends the loop over the blocks in the frame, and passes control to an end block 1699.

Figure 17:
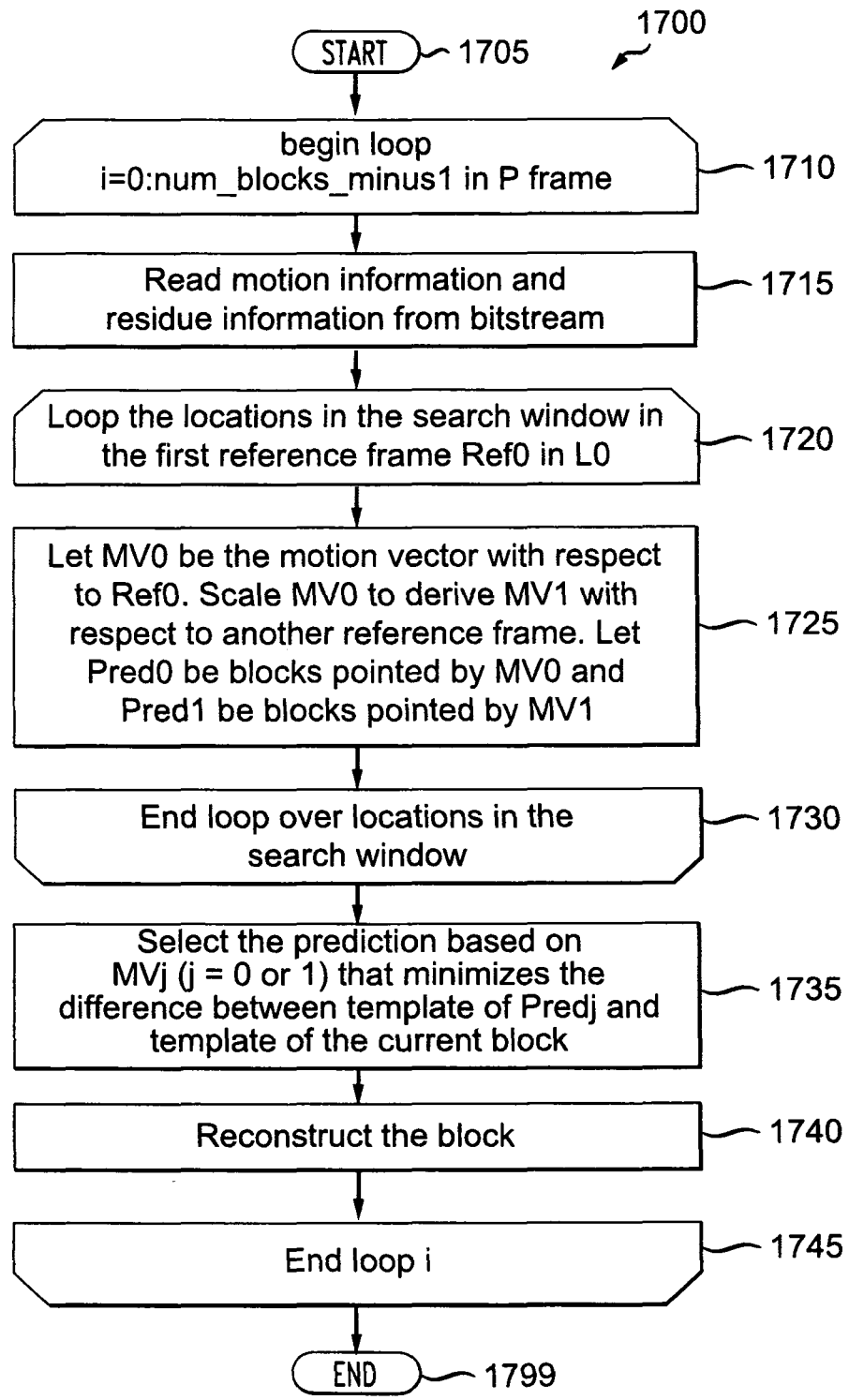
FIG. 17 is a flow diagram showing another exemplary method for uni-prediction of self derivation of motion estimation in a video decoder, in accordance with an embodiment of the present principles.

Turning to FIG. 17, another exemplary method for uni-prediction of self derivation of motion estimation in a video decoder is indicated generally by the reference numeral 1700. The method 1700 corresponds to Embodiment 6 described herein. The method 1700 includes a start block 1705 that passes control to a loop limit block 1710. The loop limit block 1710 begins a first loop using a variable i having a value from 0 to num_blocks_minus1 in P frame, and passes control to a function block 1715. The function block 1715 reads motion information and residue information from a bitstream, and passes control to a loop limit block 1720. The loop limit block 1720 begins a second loop over the locations in a search window in the first reference frame Ref0 in L0, and passes control to a function block 1725. The function block 1725 lets MV0 be the motion vector with respect to Ref0, scales MV0 to derive MV1 with respect to another reference frame, lets Pred0 be the block pointed to by MV0, lets Pred1 be the block pointed to by MV1, and passes control to a loop limit block 1730. The loop limit block 1730 ends the loop over the locations in the search window, and passes control to a function block 1735. The function block 1735 selects the prediction based on MVj (j=0 or 1) that minimizes the distortion between the template of Predj and the template of the current block, and passes control to a function block 1740. The function block 1740 reconstructs the block, and passes control to a loop limit block 1745. The loop limit block 1745 ends the loop over the blocks in the frame, and passes control to an end block 1799.

Syntax

We show syntax for one example. In this example, a new syntax sdme_flag is added for all inter prediction modes larger than 8×8. TABLE 2 shows exemplary macroblock prediction syntax, in accordance with an embodiment of the present principles.

performing uni-prediction or bi-prediction for the portion based on one or more criterion.

Another advantage/feature is the apparatus having the video encoder as described above, wherein the one or more criterion include a rate-distortion cost.

Yet another advantage/feature is the apparatus having the video encoder as described above, wherein the portion is encoded into a resultant bitstream, and an indication relating to the portion is explicitly signaled in the resultant bitstream to a corresponding decoder, the indication specifying a prediction used to encode the portion and which of the uni-prediction or the bi-prediction is used to generate the prediction.

Still another advantage/feature is the apparatus having the video encoder as described above, wherein an indication relating to the portion is implicitly signaled to a corresponding decoder, the indication specifying at least one of a prediction used to encode the portion and which of the uni-prediction or the bi-prediction is used to generate the prediction.

Still yet another advantage/feature is the apparatus having the video encoder as described above, wherein a prediction is derived for the portion from at least one of the uni-prediction and the bi-prediction based on information for

TABLE 1

| mb_pred( mb_type ) { | C | Descriptor |
|---|---|---|
|   if( MbPartPredMode( mb_type, 0 ) = = Intra_4x4 \|\| | | |
|     MbPartPredMode( mb_type, 0 ) = = Intra_8x8 \|\| | | |
|     MbPartPredMode( mb_type, 0 ) = = Intra_16x16 ) { | | |
|     ..... | | |
|   } else { | | |
|     sdme_flag | | u(1) \| ae(1) |
|     if( sdme_flag==0 && MbPartPredMode( mb_type, 0 ) != Direct ) | | |
|       for( mbPartIdx = 0; mbPartIdx < NumMbPart( mb_type ); mbPartIdx++) | | |
|         if( ( num_ref_idx_l0_active_minus1 > 0 \|\| | | |
|           mb_field_decoding_flag ) && | | |
|         MbPartPredMode( mb_type, mbPartIdx) != Pred_L1 ) | | |
|           ref_idx_l0[ mbPartIdx ] | 2 | te(v) \| ae(v) |
|       for( mbPartIdx = 0; mbPartIdx < NumMbPart( mb_type ); mbPartIdx++) | | |
|         if( ( num_ref_idx_l1_active_minus1 > 0 \|\| | | |
|           mb_field_decoding_flag ) && | | |
|         MbPartPredMode( mb_type, mbPartIdx ) != Pred_L0 ) | | |
|           ref_idx_l1[ mbPartIdx ] | 2 | te(v) \| ae(v) |
|       for( mbPartIdx = 0; mbPartIdx < NumMbPart( mb_type ); mbPartIdx++) | | |
|         if( MbPartPredMode ( mb_type, mbPartIdx) != Pred_L1 ) | | |
|           for( compIdx = 0; compIdx < 2; compIdx++ ) | | |
|             mvd_l0[ mbPartIdx ][ 0 ][ compIdx ] | 2 | se(v) \| ae(v) |
|       for( mbPartIdx = 0; mbPartIdx < NumMbPart( mb_type ); mbPartIdx++) | | |
|         if( MbPartPredMode( mb_type, mbPartIdx ) != Pred_L0 ) | | |
|           for( compIdx = 0; compIdx < 2; compIdx++ ) | | |
|             mvd_l1[ mbPartIdx ][ 0 ][ compIdx ] | 2 | se(v) \| (ae(v) |
| } | | |

The semantics of some of the syntax elements shown in TABLE 2 are as follows. For P modes, sdme_flag equal to 1 specifies SDME is applied. For B modes, sdme_flag equal to 1 specifies SDME is applied. For B_direct_16×16, implicit deriving method with template matching is used to decide bi-prediction or uni-prediction. sdme_flag equal to 0 specifies the H.264 method is used.

A description will now be given of some of the many attendant advantages/features of the present invention, some of which have been mentioned above. For example, one advantage/feature is an apparatus having a video encoder for encoding at least a portion of a picture, the video encoder including a self derivation motion estimator for performing self derivation motion estimation for the portion, wherein the self derivation motion estimation is used for selectively reconstructed neighboring blocks with respect to the portion, the information comprising at least one of mode information, motion information, and distortion.

Moreover, another advantage/feature is the apparatus having the video encoder as described above, wherein the picture is a bi-predictive picture.

Further, another advantage/feature is the apparatus having the video encoder as described above, wherein the picture is a uni-predictive picture.

Also, another advantage/feature is the apparatus having the video encoder as described above, wherein only a motion vector corresponding to a motion between the picture and a forward reference picture is permitted to be used to encode the portion, another motion vector corresponding to a motion between the picture and another reference picture is restricted from use to encode the portion.

Additionally, another advantage/feature is the apparatus having the video encoder as described above, wherein a reference index is used to explicitly signal a motion vector used to encode the portion.

Moreover, another advantage/feature is the apparatus having the video encoder as described above, wherein a combination of implicit signaling and explicit signaling is used to provide an indication to a corresponding decoder of a prediction generated from the uni-prediction or the bi-prediction and used to encode the portion and which of the uni-prediction or the bi-prediction is used to generate the prediction.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding at least a portion of a picture, the video encoder comprising a self derivation motion estimator for performing self derivation motion estimation for the portion, wherein the self derivation motion estimator determines a first motion vector ("MV0") between the picture and a forward reference picture and a second motion vector ("MV1") between the picture and a backward reference picture;
wherein the self derivation motion estimator further demonstrates a first difference between MV0 and a first motion vector predictor, where the first motion vector predictor is determined based on motion vectors of neighboring blocks, wherein the self derivation motion estimator further determines a second difference between MV1 and a second motion vector predictor, where the second motion vector predictor is determined based on motion vectors of neighboring blocks,
wherein the self derivation motion estimator further selects bi-directional prediction among uni-directional prediction or bi-directional prediction for the portion of the picture based on a determination that the first difference is less than a threshold and the second difference is less than the threshold.

2. An apparatus, comprising:
a video encoder for encoding at least a portion of a picture, the video encoder comprising a self derivation motion estimator for performing self derivation motion estimation for the portion,
wherein the self derivation motion estimator determines a first motion vector ("MV0") between the picture and a forward reference picture and a second motion vector ("MV1") between the picture and a backward reference picture;
wherein the self derivation motion estimator further determines a first difference between MV0 and a first motion vector predictor, where the first motion vector predictor is determined based on motion vectors of neighboring blocks,
wherein the self derivation motion estimator further determines a second difference between MV1 and a second motion vector predictor, where the second motion vector predictor is determined based on motion vectors of neighboring blocks,
wherein the self derivation motion estimator further selects bi-directional prediction among uni-directional prediction or bi-directional prediction for the portion of the picture based on a determination that the first difference is not less than a threshold and the second difference is not less than the threshold.

3. An apparatus, comprising:
a video encoder for encoding at least a portion of a picture, the video encoder comprising a self derivation motion estimator for performing self derivation motion estimation for the portion,
wherein the self derivation motion estimator determines a first motion vector ("MV0") between the picture and a forward reference picture and a second motion vector ("MV1") between the picture and a backward reference picture;
wherein the self derivation motion estimator further determines a first difference between MV0 and a first motion vector predictor, where the first motion vector predictor is determined based on motion vectors of neighboring blocks,
wherein the self derivation motion estimator further determines a second difference between MV1 and a second motion vector predictor, where the second motion vector predictor is determined based on motion vectors of neighboring blocks,
wherein the self derivation motion estimator further selects uni-directional prediction among uni-directional prediction or bi-directional prediction for the portion of the picture based on a determination that only one of the first and second difference are less than a threshold.

4. The apparatus of claim 1, wherein a prediction is derived for the portion from at least one of the uni-directional prediction and the bi-directional prediction based on information for reconstructed neighboring blocks with respect to the portion, the information comprising at least one of mode information, motion information, and distortion.

5. The apparatus of claim 1, wherein the picture is a bi-predictive picture.

6. The apparatus of claim 1, wherein the picture is a uni-predictive picture.

7. The apparatus of claim 1, wherein only a motion vector corresponding to a motion between the picture and a forward reference picture is permitted to be used to encode the portion, another motion vector corresponding to a motion between the picture and another reference picture is restricted from use to encode the portion.

8. The apparatus of claim 1, wherein a reference index is used to explicitly signal a motion vector used to encode the portion.

9. The apparatus of claim 1, wherein a combination of implicit signaling and explicit signaling is used to provide an indication to a corresponding decoder of a prediction generated from the uni-directional prediction or the bi-directional prediction and used to encode the portion and which of the uni-directional prediction or the bi-directional prediction is used to generate the prediction.

10. In a video encoder, a method, comprising:
encoding at least a portion of a picture using self derivation motion estimation,
wherein the self derivation motion estimation determines a first motion vector ("MV0") between the picture and a forward reference picture and a second motion vector ("MV1") between the picture and a backward reference picture;
wherein the self derivation motion estimation includes determining a first difference between MV0 and a first motion vector predictor, where the first motion vector predictor is determined based on motion vectors of neighboring blocks,
wherein the self derivation motion estimation includes determining a second difference between MV1 and a second motion vector predictor, where the second motion vector predictor is determined based on motion vectors of neighboring blocks,
wherein the self derivation motion estimation includes selecting bi-directional prediction among uni-directional prediction or bi-directional prediction for the portion of the picture based on a determination that the first difference is less than a threshold and the second difference is less than the threshold.

11. In a video encoder, a method, comprising:
encoding at least a portion of a picture using self derivation motion estimation,
wherein the self derivation motion estimation determines a first motion vector ("MV0") between the picture and a forward reference picture and a second motion vector ("MV1") between the picture and a backward reference picture;
wherein the self derivation motion estimation includes determining a first difference between MV0 and a first motion vector predictor, where the first motion vector predictor is determined based on motion vectors of neighboring blocks,
wherein the self derivation motion estimation includes determining a second difference between MV1 and a second motion vector predictor, where the second motion vector predictor is determined based on motion vectors of neighboring blocks,
wherein the self derivation motion estimation includes selecting bi-directional prediction among uni-directional prediction or bi-directional prediction for the portion of the picture based on a determination that the first difference is not less than a threshold and the second difference is not less than the threshold.

12. In a video encoder, a method, comprising:
encoding at least a portion of a picture using self derivation motion estimation,
wherein the self derivation motion estimation determines a first motion vector ("MV0") between the picture and a forward reference picture and a second motion vector ("MV1") between the picture and a backward reference picture;
wherein the self derivation motion estimation includes determining a first difference between MV0 and a first motion vector predictor, where the first motion vector predictor is determined based on motion vectors of neighboring blocks,
wherein the self derivation motion estimation includes determining a second difference between MV1 and a second motion vector predictor, where the second motion vector predictor is determined based on motion vectors of neighboring blocks,
wherein the self derivation motion estimator selects uni-directional prediction among uni-directional prediction or bi-directional prediction for the portion of the picture based on a determination that only one of the first and second difference are less than a threshold.

13. The method of claim 10, wherein a prediction is derived for the portion from at least one of the uni-directional prediction and the bi-directional prediction based on information of reconstructed neighboring blocks with respect to the portion, the information comprising at least one of mode information, motion information, and distortion.

14. The method of claim 10, wherein the picture is a bi-predictive picture.

15. The method of claim 10, wherein the picture is a uni-predictive picture.

16. The method of claim 10, wherein only a motion vector corresponding to a motion between the picture and a forward reference picture is permitted to be used to encode the portion, another motion vector corresponding to a motion between the picture and another reference picture is restricted from use to encode the portion.

17. The method of claim 10, wherein a reference index is used to explicitly signal a motion vector used to encode the portion.

18. The method of claim 10, wherein a combination of implicit signaling and explicit signaling is used to provide an indication to a corresponding decoder of a prediction generated from the uni-directional prediction or the bi-directional prediction and used to encode the portion and which of the uni-prediction or the bi-prediction is used to generate the prediction.

19. An apparatus, comprising:
a video decoder for decoding at least a portion of a picture, the video decoder comprising a self derivation motion estimator for performing self derivation motion estimation for the portion,
wherein the self derivation motion estimator determines a first motion vector ("MV0") between the picture and a forward reference picture and a second motion vector ("MV1") between the picture and a backward reference picture;

wherein the self derivation motion estimator further determines a first difference between MV0 and a first motion vector predictor, where the first motion vector predictor is determined based on motion vectors of neighboring blocks, wherein the self derivation motion estimator further determines a second difference between MV1 and a second motion vector predictor, where the second motion vector predictor is determined based on motion vectors of neighboring blocks, wherein the self derivation motion estimator further selects bi-directional prediction among uni-directional prediction or bi-directional prediction for the portion of the picture based on a determination that the first difference is not less than a threshold and the second difference is not less than the threshold.

20. An apparatus, comprising:
a video decoder for decoding at least a portion of a picture, the video decoder comprising a self derivation motion estimator for performing self derivation motion estimation for the portion,
wherein the self derivation motion estimator determines a first motion vector ("MV0") between the picture and a forward reference picture and a second motion vector ("MV1") between the picture and a backward reference picture;
wherein the self derivation motion estimator further determines a first difference between MV0 and a first motion vector predictor, where the first motion vector predictor is determined based on motion vectors of neighboring blocks,
wherein the self derivation motion estimator further determines a second difference between MV1 and a second motion vector predictor, where the second motion vector predictor is determined based on motion vectors of neighboring blocks,
wherein self derivation motion estimator further estimation selects bi-directional prediction among uni-directional prediction or bi-directional prediction for the portion of the picture based on a determination that the first difference is not less than a threshold and the second difference is not less than the threshold.

21. The apparatus of claim 19, wherein a prediction is derived for the portion from at least one of the uni-directional prediction and the bi-directional prediction based on information for reconstructed neighboring blocks with respect to the portion, the information comprising at least one of mode information, motion information, and distortion.

22. The apparatus of claim 19, wherein the picture is a bi-predictive picture.

23. The apparatus of claim 19, wherein the picture is a uni-predictive picture.

24. The apparatus of claim 19, wherein only a motion vector corresponding to a motion between the picture and a forward reference picture is permitted to be used to decode the portion, another motion vector corresponding to a motion between the picture and another reference picture is restricted from use to decode the portion.

25. The apparatus of claim 19, wherein a motion vector used to encode the portion is explicitly determined from a reference index, the portion being decoded using the motion vector.

26. The apparatus of claim 19, wherein a prediction generated from the uni-directional prediction or the bi-directional prediction for use to decode the portion and which of the uni-directional prediction or the bi-directional prediction is used to generate the prediction is determined explicitly and implicitly.

27. In a video decoder, a method, comprising:
decoding at least a portion of a picture using self derivation motion estimation, wherein the self derivation motion estimation determines a first motion vector ("MV0") between the picture and a forward reference picture and a second motion vector ("MV1") between the picture and a backward reference picture:
wherein the self derivation motion estimation includes determining a first difference between MV0 and a first motion vector predictor, where the first motion vector predictor is determined based on motion vectors of neighboring blocks, wherein the self derivation motion estimation includes determining a second difference between MV1and a second motion vector predictor, where the second motion vector predictor is determined based on motion vectors of neighboring blocks,
wherein the self derivation motion estimation includes selecting bi-directional prediction among uni-directional prediction or bi-directional prediction for the portion of the picture based on a determination that the first difference is less than a threshold and the second difference is less than the threshold
wherein the self derivation motion estimator further determines a first difference between MV0 and a first motion vector predictor, where the first motion vector predictor is determined based on motion vectors of neighboring blocks, wherein the self derivation motion estimator further determines a second difference between MV1 and a second motion vector predictor, where the second motion vector predictor is determined based on motion vectors of neighboring blocks,
wherein the self derivation motion estimator further selects bi-directional prediction among uni-directional prediction or bi-directional prediction for the portion of the picture based on a determination that the first difference is less than a threshold and the second difference is less than the threshold.

28. In a video decoder, a method, comprising:
decoding at least a portion of a picture using self derivation motion estimation,
wherein the self derivation motion estimation determines a first motion vector ("MV0") between the picture and a forward reference picture and a second motion vector ("MV1") between the picture and a backward reference picture;
wherein the self derivation motion estimation includes determining a first difference between MV0 and a first motion vector predictor, where the first motion vector predictor is determined based on motion vectors of neighboring blocks,
wherein the self derivation motion estimation includes determining a second difference between MV1and a second motion vector predictor, where the second motion vector predictor is determined based on motion vectors of neighboring blocks,
wherein the self derivation motion estimation includes selecting bi-directional prediction among uni-directional prediction or bi-directional prediction for the portion of the picture based on a determination that the first difference is not less than a threshold and the second difference is not less than the threshold.

29. The method of claim 27, wherein a prediction is derived for the portion from at least one of the uni-directional prediction and the bi-directional prediction based on information of reconstructed neighboring blocks with respect to the portion, the information comprising at least one of mode information, motion information, and distortion.

30. The method of claim 27, wherein the picture is a bi-predictive picture.

31. The method of claim 27, wherein the picture is a uni-predictive picture.

32. The method of claim 27, wherein only a motion vector corresponding to a motion between the picture and a forward reference picture is permitted to be used to decode the portion, another motion vector corresponding to a motion between the picture and another reference picture is restricted from use to decode the portion.

33. The method of claim 27, wherein a motion vector used to encode the portion is explicitly determined from a reference index, the portion being decoded using the motion vector.

34. The method of claim 27, wherein a prediction generated from the uni-directional prediction or the bi-directional prediction for use to decode the portion and which of the uni-directional prediction or the bi-directional prediction is used to generate the prediction is determined explicitly and implicitly.

35. A non-transitory computer readable storage media having video signal data encoded thereupon when executed by a processor, performs a method comprising:
    decoding, at least a portion of a picture encoded using self derivation motion estimation, wherein the self derivation motion estimation determines a first motion vector ("MV0") between the picture and a forward reference picture and a second motion vector ("MV1") between the picture and a backward reference picture;
    wherein the self derivation motion estimation includes determining a first difference between MV0 and a first motion vector predictor, where the first motion vector predictor is determined based on motion vectors of neighboring blocks, wherein the self derivation motion estimation includes determining a second difference between MV1 and a second motion vector predictor, where the second motion vector predictor is determined based on motion vectors of neighboring blocks,
    wherein the self derivation motion estimation selects bi-directional prediction among uni-directional prediction or bi-directional prediction for the portion of the picture on a determination that the first difference is not less than a threshold and the second difference is not less than the threshold.

36. An apparatus, comprising:
    a video decoder for decoding at least a portion of a picture, the video decoder comprising a self derivation motion estimator for performing self derivation motion estimation for the portion,
    wherein the self derivation motion estimator determines a first motion vector ("MV0") between the picture and a forward reference picture and a second motion vector ("MV1") between the picture and a backward reference picture;
    wherein the self derivation motion estimator further determines a first difference between MV0 and a first motion vector predictor, where the first motion vector predictor is determined based on motion vectors of neighboring blocks,
    wherein the self derivation motion estimator further determines a second difference between MV1 and a second motion vector predictor, where the second motion vector predictor is determined based on motion vectors of neighboring blocks
    wherein the self derivation motion estimator further selects uni-directional prediction among uni-directional prediction or bi-directional prediction for the portion of the picture based on a determination that only one of the first and second difference are less than a threshold.

37. In a video decoder, a method, comprising:
    decoding at least a portion of a picture using self derivation motion estimation,
    wherein the self derivation motion estimation determines a first motion vector ("MV0") between the picture and a forward reference picture and a second motion vector ("MV1") between the picture and a backward reference picture;
    wherein the self derivation motion estimation includes determining a first difference between MV0 and a first motion vector predictor, where the first motion vector predictor is determined based on motion vectors of neighboring blocks,
    wherein the self derivation motion estimation includes determining a second difference between MV1 and a second motion vector predictor, where the second motion vector predictor is determined based on motion vectors of neighboring blocks,
    wherein the self derivation motion estimation includes selecting bi-directional prediction among uni-directional prediction or bi-directional prediction for the portion of the picture based on a determination that the first difference is not less than a threshold and the second difference is not less than the threshold.

* * * * *